US009317989B2

(12) United States Patent
Grow et al.

(10) Patent No.: US 9,317,989 B2
(45) Date of Patent: Apr. 19, 2016

(54) CAMERA AUDIT ACCEPTER MECHANISM AND CAMERA AUDIT DISPENSING MECHANISM

(71) Applicant: KIOSK INFORMATION SYSTEMS, INC., Louisville, CO (US)

(72) Inventors: Roger H. Grow, Lafayette, CO (US); Richard L. Malone, Lafayette, CO (US); Charles Newsom, Littleton, CO (US)

(73) Assignee: Kiosk Information Systems, Inc., Louisville, CO (US)

( * ) Notice: Subject to any disclaimer, the term of this patent is extended or adjusted under 35 U.S.C. 154(b) by 145 days.

(21) Appl. No.: 14/044,689

(22) Filed: Oct. 2, 2013

(65) Prior Publication Data

US 2014/0163728 A1 Jun. 12, 2014

Related U.S. Application Data

(60) Provisional application No. 61/709,126, filed on Oct. 2, 2012.

(51) Int. Cl.
G07F 9/00 (2006.01)
G07F 9/02 (2006.01)

(52) U.S. Cl.
CPC .................... *G07F 9/026* (2013.01)

(58) Field of Classification Search
CPC ........................................ G07F 9/026
USPC ................................ 700/231–244
See application file for complete search history.

(56) References Cited

U.S. PATENT DOCUMENTS

| 4,573,641 A | 3/1986 | DeWoolfson et al. |
| 4,636,634 A | 1/1987 | Harper et al. |
| 4,893,727 A | 1/1990 | Near |
| 5,140,141 A | 8/1992 | Inagaki et al. |

(Continued)

FOREIGN PATENT DOCUMENTS

| EP | 0992956 A1 | 4/2000 |
| WO | 8909460 A1 | 10/1989 |

(Continued)

OTHER PUBLICATIONS

Extended European Search Report issed in EP12779904.7, mailed Nov. 11, 2014. 7 pages.

(Continued)

Primary Examiner — Patrick Cicchino
(74) Attorney, Agent, or Firm — Faegre Baker Daniels LLP

(57) ABSTRACT

A system for receiving and auditing objects according to an embodiment of the invention includes a housing having a front panel, a receiving area, an auditing area, and a drop chute, wherein the receiving area includes a shelf, the front panel includes an opening, a door assembly having a pushing wall and a second pushing wall and assembly moveable between an open position in which an object can be inserted through the opening and into the receiving area, and a closed position in which the door assembly prevents access to the receiving area, wherein the pushing wall moves the object from the shelf into the auditing area as the door assembly closed; and a control system coupled to a camera and switch, wherein the door assembly activates the switch when it is in the closed position, the control system images the object with the camera in response to switch activation.

20 Claims, 24 Drawing Sheets

(56) References Cited

U.S. PATENT DOCUMENTS

| | | |
|---|---|---|
| 5,240,139 A | 8/1993 | Chirnomas |
| 5,730,316 A | 3/1998 | Falk et al. |
| 6,105,009 A | 8/2000 | Cuervo |
| 6,253,955 B1 | 7/2001 | Bower |
| 6,384,402 B1 | 5/2002 | Hair, III et al. |
| 6,513,677 B1 | 2/2003 | Sorensen et al. |
| 6,707,381 B1 | 3/2004 | Maloney |
| 6,732,014 B2 | 5/2004 | Whitten et al. |
| 6,748,296 B2 * | 6/2004 | Banerjee et al. ............ 700/241 |
| 6,794,634 B2 | 9/2004 | Hair et al. |
| 7,128,237 B2 * | 10/2006 | Holdway et al. ............ 221/127 |
| 7,191,034 B2 | 3/2007 | Whitten et al. |
| 7,191,915 B2 | 3/2007 | Hair, III et al. |
| 7,286,901 B2 | 10/2007 | Whitten et al. |
| 7,343,220 B2 | 3/2008 | Hair, III et al. |
| 7,480,543 B2 | 1/2009 | Bautista et al. |
| 7,497,353 B2 | 3/2009 | Chirnomas |
| 7,774,097 B2 | 8/2010 | Rosenblum |
| 7,809,470 B2 | 10/2010 | Shoenfeld |
| 7,857,161 B2 * | 12/2010 | Pinney et al. ................ 221/10 |
| 7,908,031 B2 | 3/2011 | Saether et al. |
| 8,140,187 B2 | 3/2012 | Campbell et al. |
| 8,230,662 B2 | 7/2012 | Boutin |
| 8,267,491 B2 * | 9/2012 | Artsiely ........................ 312/326 |
| 8,380,347 B2 * | 2/2013 | Garson et al. ................ 700/244 |
| 2002/0087375 A1 * | 7/2002 | Griffin et al. .................... 705/7 |
| 2006/0045674 A1 | 3/2006 | Craven |
| 2009/0076650 A1 | 3/2009 | Faes |
| 2009/0149985 A1 | 6/2009 | Chirnomas |
| 2010/0042255 A1 | 2/2010 | Boutin |
| 2010/0138037 A1 | 6/2010 | Adelberg et al. |
| 2010/0314405 A1 | 12/2010 | Alvarez et al. |
| 2011/0017764 A1 * | 1/2011 | Liguori et al. .................... 221/1 |
| 2011/0054673 A1 | 3/2011 | Segal et al. |
| 2012/0012606 A1 | 1/2012 | Longley et al. |
| 2012/0029687 A1 | 2/2012 | Hagen et al. |
| 2013/0123978 A1 * | 5/2013 | Stark et al. ................... 700/242 |

FOREIGN PATENT DOCUMENTS

| | | |
|---|---|---|
| WO | WO9919849 A1 | 4/1999 |
| WO | 2009001383 A1 | 12/2008 |

OTHER PUBLICATIONS

International Search Report and Written Opinion issued in PCT/US2012/036364, mailed Jul. 20, 2012, 7 pages.

* cited by examiner

CUSTOMER INTERFACE PANEL DOOR SPRING LOADED IN CLOSED POSITION

CUSTOMER INTERFACE PANEL DOOR OPENED BY CUSTOMER

US 9,317,989 B2

CAMERA AUDIT ACCEPTER MECHANISM AND CAMERA AUDIT DISPENSING MECHANISM

CROSS-REFERENCE TO RELATED APPLICATIONS

This application claims the benefit of U.S. Provisional Patent Application Ser. No. 61/709,126, filed on Oct. 2, 2012, which is incorporated by reference herein in its entirety for all purposes.

TECHNICAL FIELD

Embodiments of the present invention relate to automated vending and recycling.

BACKGROUND

Current automated vending and/or receiving systems often do not permit precise control of inventory and sale of particular products within the vending systems, or log confirmation of appropriate product delivery or used item receipt. Complex product or object imaging and identification systems are costly and often cost prohibitive for stand-alone automated vending or receiving units, and such components often require greater maintenance and/or are more sensitive to environmental conditions. When something goes wrong with product receipt and/or product delivery, the owners of such automated systems must often rely solely upon customer or user input to determine what went wrong.

SUMMARY

A system for receiving and auditing objects according to embodiments of the present invention includes a housing having a front panel, a receiving area, an auditing area, and a drop chute, wherein the receiving area includes a stationary shelf forming a bottom portion of the receiving area, wherein the front panel comprises an opening; a door assembly having a first pushing wall and a second pushing wall, the door assembly moveable with respect to the housing between an open position in which the opening at least partially aligns with the receiving area to permit an object to be inserted through the opening and onto the stationary shelf of the receiving area, and a closed position in which the door assembly prevents access to the receiving area through the front panel; wherein the first pushing wall is configured to move the object from the stationary shelf into the auditing area as the door assembly is moved from the open position to the closed position; and a control system communicably coupled to a camera and a switch, wherein the door assembly is configured to activate the switch when the door assembly is in or near the closed position, the control system configured to capture a representation of the object with the camera in response to activation of the switch; wherein the second pushing wall is configured to move the object from the auditing area to the drop chute as the door assembly is moved from the closed position to the open position.

The system of paragraph [0004], wherein the first pushing wall and the second pushing are rigidly interconnected such that they move as a single unit.

The system of any of paragraph [0004] or [0005], the auditing area is below the receiving area, such that the first pushing wall is further configured to move the object from the stationary shelf to cause it to fall into the auditing area.

The system of any of paragraphs [0004] to [0006], wherein the stationary shelf is substantially flat.

The system of any of paragraphs [0004] to [0007], wherein the switch is a mechanical switch.

The system of any of paragraphs [0004] to [0008], wherein the first pushing wall contacts the mechanical switch to activate the mechanical switch when the door assembly is in the closed position.

The system of any of paragraphs [0004] to [0009], wherein the representation of the object is a photographic image of the object.

The system of any of paragraphs [0004] to [0010], further comprising an actuator, the actuator coupled to the door assembly and configured to move the door assembly between the open and closed positions.

The system of any of paragraphs [0004] to [0011], wherein the actuator comprises a knob, wherein the knob is on an opposite side of the front panel from the door assembly.

The system of any of paragraphs [0004] to [0012], wherein the front panel includes a slot through which the knob moves as the door assembly is moved between the open and closed positions, wherein the slot is configured to limit movement of the door assembly.

The system any of paragraphs [0004] to [0013], wherein movement of the door assembly between the open and closed positions is a sliding along a substantially horizontal direction.

The system of any of paragraphs [0004] to [0014], wherein one or more drop sensors communicably coupled to the control system, the one or more drop sensors configured to detect the product passing through the drop chute.

A system for receiving and auditing objects, according to embodiments of the present invention, includes a housing having a front panel, a receiving area, an auditing area, and a drop chute, wherein the receiving area includes a shelf forming a bottom portion of the receiving area, wherein the front panel comprises an opening; a door assembly having a pushing wall and a second pushing wall, the door assembly moveable with respect to the housing between an open position in which the opening at least partially aligns with the receiving area to permit an object to be inserted through the opening and onto the shelf of the receiving area, and a closed position in which the door assembly prevents access to the receiving area through the front panel; wherein the pushing wall is configured to move the object from the shelf into the auditing area as the door assembly is moved from the open position to the closed position; and a control system communicably coupled to a camera and a switch, wherein the door assembly is configured to activate the switch when the door assembly is in or near the closed position, the control system configured to capture an image of the object with the camera in response to activation of the switch.

A system for product delivery and audit, according to embodiments of the present invention, includes a door assembly, the door assembly coupled to a product delivery chute at a pivot axis, the door assembly moveable between a closed position and an open position by pivoting about the pivot axis; wherein the door assembly comprises an audit area, and wherein in the closed position the door assembly prevents access to the audit area, and the audit area is configured to receive product from the product delivery chute; a control system communicably coupled to a camera, a door sensor, and a product sensor, wherein the control system is configured to capture a representation of the product with the camera when the door sensor senses that the door assembly is in the closed position and the product sensor senses that the product is in the audit area; wherein in the open position the door assembly permits access to the product for which a representation had previously been captured, and wherein in the open position the door assembly also prevents access to the audit area and prevents access to additional products delivered through the product delivery chute while the door assembly is in the open position.

The system of any of paragraphs [0004] to [0017], wherein the door assembly is biased toward the closed position.

The system of any of paragraphs [0004] to [0018], wherein the product sensor is a through-beam sensor.

The system of any of paragraphs [0004] to [0019], wherein the door assembly comprises a curved top wall and a rear panel, wherein the rear panel is configured to receive the product when the product is received into the audit area from the product delivery chute, and wherein the curved top wall and the rear panel block access to the audit area when the door assembly is in the open position.

The system of any of paragraphs [0004] to [0020], wherein a product receiving surface of the rear panel is at a first angle when the door assembly is in the closed position, wherein an inner bottom surface of the product delivery chute is at a second angle, and wherein the first angle is substantially the same as the second angle so as to permit the product to slide smoothly from the inner bottom surface to the product receiving surface.

The system of any of paragraphs [0004] to [0021], wherein the door assembly further comprises a handle, wherein pulling of the handle moves the door assembly from the closed position to the open position.

The system of any of paragraphs [0004] to [0022], wherein camera is mounted at a top of the audit area above the door assembly.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
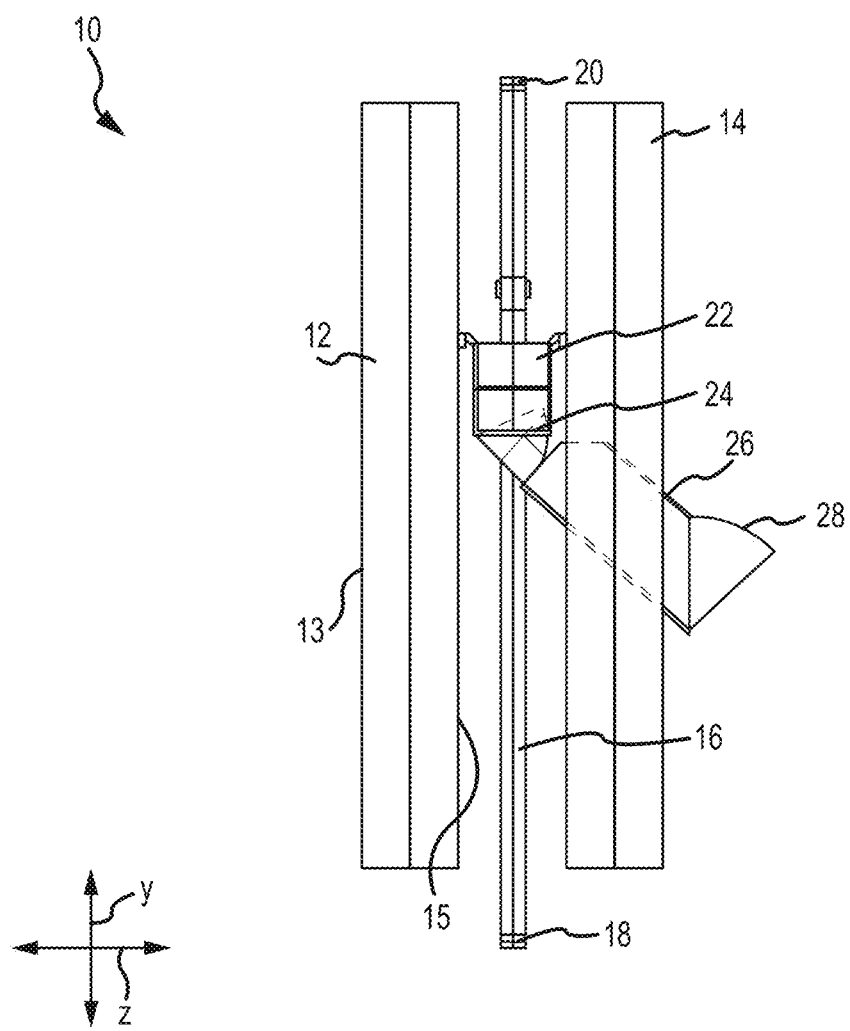
FIG. 1 illustrates a side elevation view of an automated retail system, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 2:
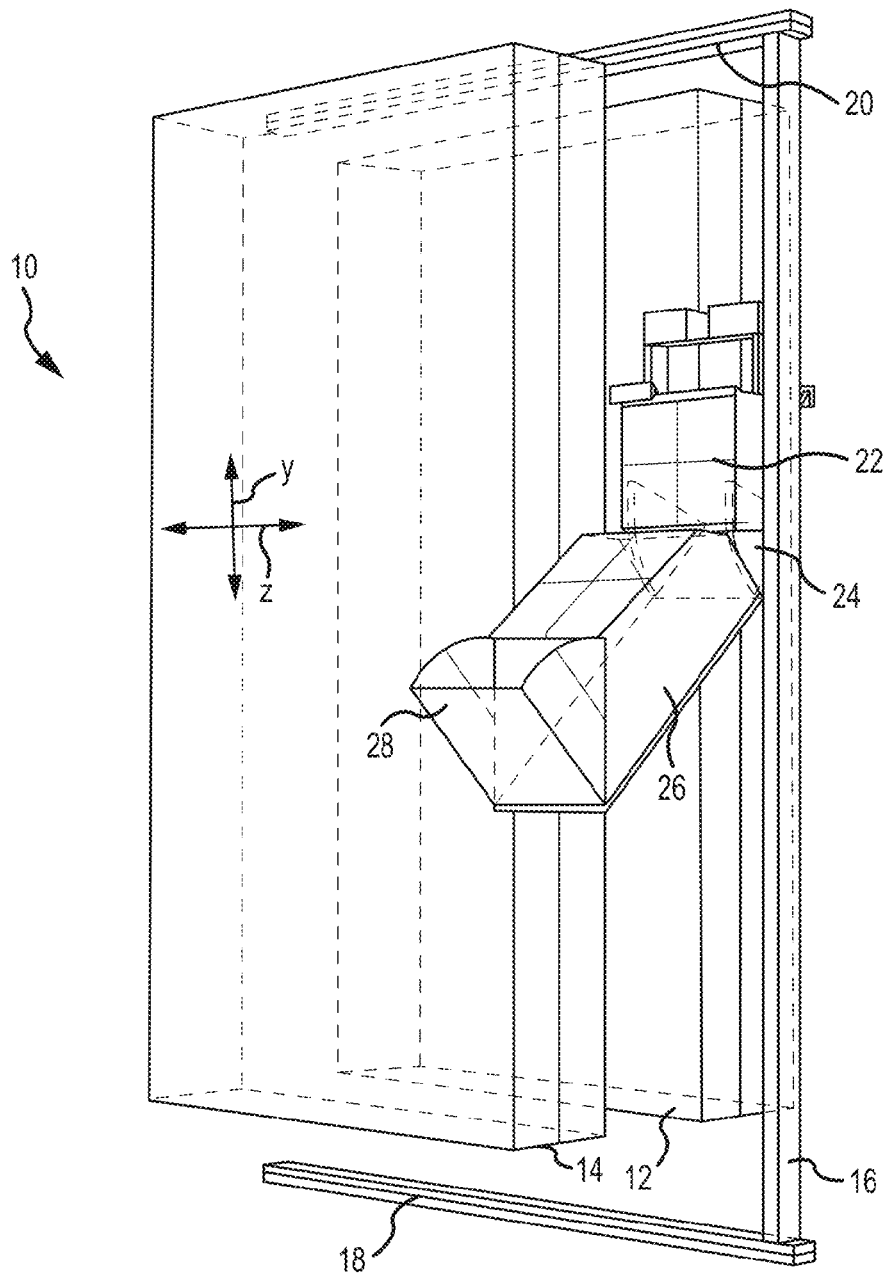
FIG. 2 illustrates a front perspective view of the automated retail system of FIG. 1, according to embodiments of the present invention.

FIGS. 1 and 2 illustrates an automated retail system 10, according to embodiments of the present invention. Automated retail system 10 includes a front product rack 14 and a rear product rack 12, as well as a rail system including a lower horizontal rail 18, an upper horizontal rail 20, and a vertical rail 16. As used herein, the term "vertical" is used to refer to a direction that is substantially parallel to a direction of a gravitational force, and the term "horizontal" is used to refer to a direction that is substantially perpendicular to the direction of the gravitational force. For example, a vertical direction would be a substantially parallel to the y direction indicated in FIG. 2, while a horizontal direction would be substantially parallel to the x direction indicated in FIG. 2. System 10 is also described in U.S. patent application Publication No. 2013/0123978, published on May 16, 2013, the contents of which are incorporated by reference herein in their entirety for all purposes.

The automated retail system 10 may further include a delivery basket 22 configured to be moved up and down along the vertical rail 16, with the vertical rail configured to move back-and-forth along the lower and upper horizontal rails 18, 20. This rail system, which may also be referred to as a gantry or gantry system, permits the product delivery basket 22 to be moved to any position along the front and/or rear product racks 12, 14 within the x-y range of motion. Once the delivery basket 22 is moved to the desired position and the product delivery door is opened, the product slides into the delivery basket 22. The delivery basket 22 is then moved to the x-y position corresponding to the delivery chute 26, where the basket trap door 24 is opened to permit the product to slide out of the basket 22, along the trap door 24, and into the delivery chute 26, where it may be retrieved through the delivery door 28, according to embodiments of the present invention.

Figure 3:
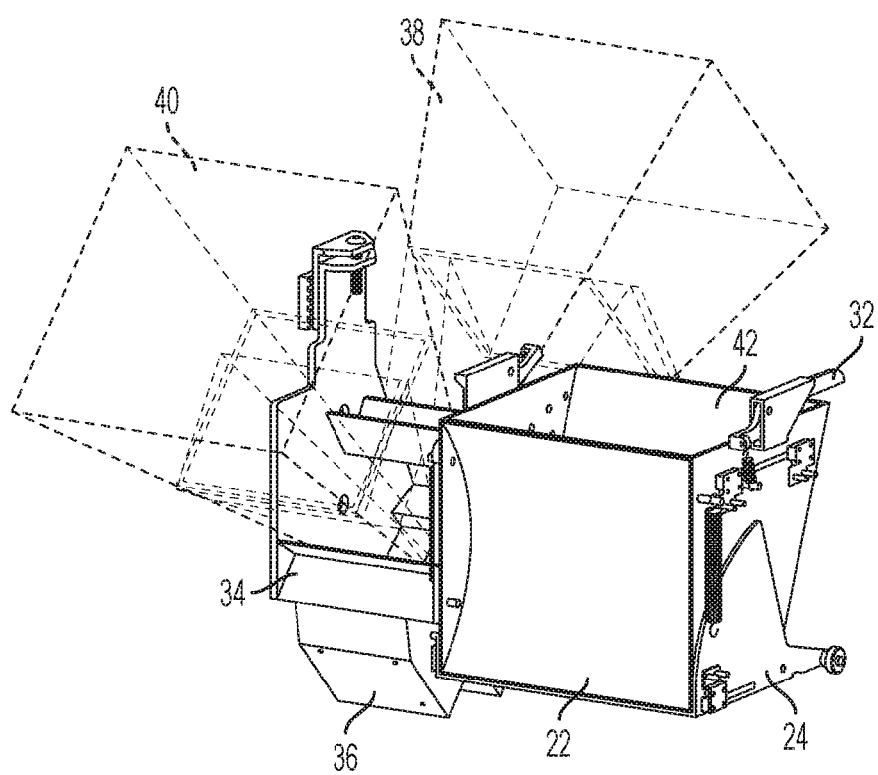
FIG. 3 illustrates a front perspective view of a product delivery basket, according to embodiments of the present invention.
Figure 4:
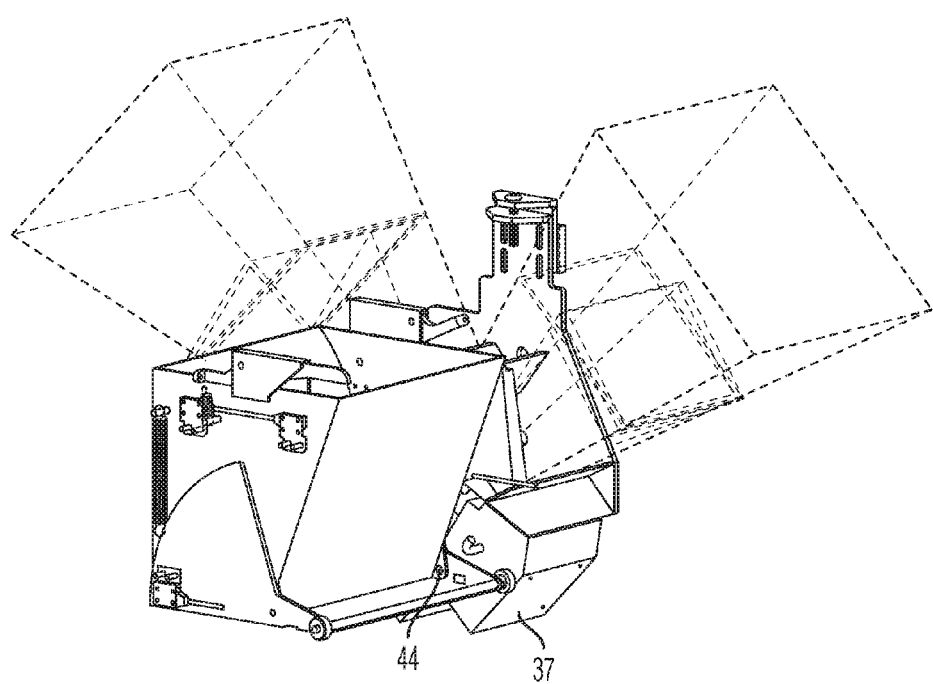
FIG. 4 illustrates a rear perspective view of the product delivery basket of FIG. 3, according to embodiments of the present invention.

FIGS. 3 and 4 illustrate front perspective views of a product delivery basket 22, according to embodiments of the present invention. Product delivery basket 22 includes a basket trap door 24, which extends under the bottom of the product delivery basket 22 in a closed configuration, and a door actuator 32, according to embodiments of the present invention. Product delivery basket 22 further includes a sensor mount 34, to which are mounted two product identification sensors 36, 37. Product identification sensors 36, 37 may be laser-based bar code scanners, camera or imaging sensors, and/or radio frequency identification (RFID) sensors, according to embodiments of the present invention. The superimposed projection cones 38, 40 are included to illustrate an exemplary three-dimensional range of the sensors 36, 37, according to embodiments of the present invention.

Figure 5:
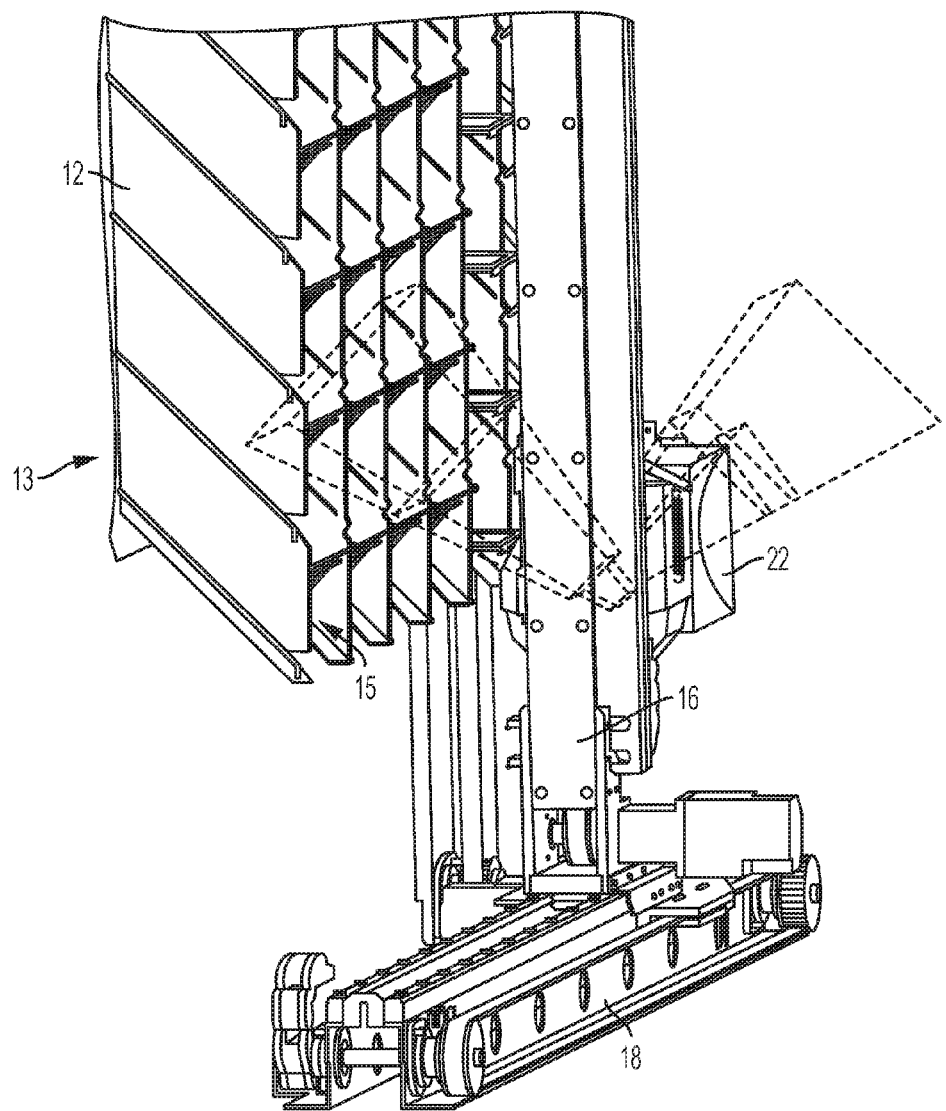
FIG. 5 illustrates a front perspective view of an automated retail system with a rear product rack, according to embodiments of the present invention.

FIG. 5 illustrates a front perspective view of an automated retail system with a rear product rack 12, according to embodiments of the present invention. The product rack 12 includes a number of product chambers or receptacles, which may be arranged into columns and rows, for example. Products may be initially loaded into the receptacles through the back side 13 of the product rack 12, and then retrieved by the basket 22 from the front side 15 of the product rack 12, according to embodiments of the present invention. Alternatively, products may be initially loaded into the receptacles from the front side 15. According to embodiments of the present invention, one product is loaded into each product receptacle. According to other embodiments, more than one product is loaded into each product receptacle.

Figure 6:
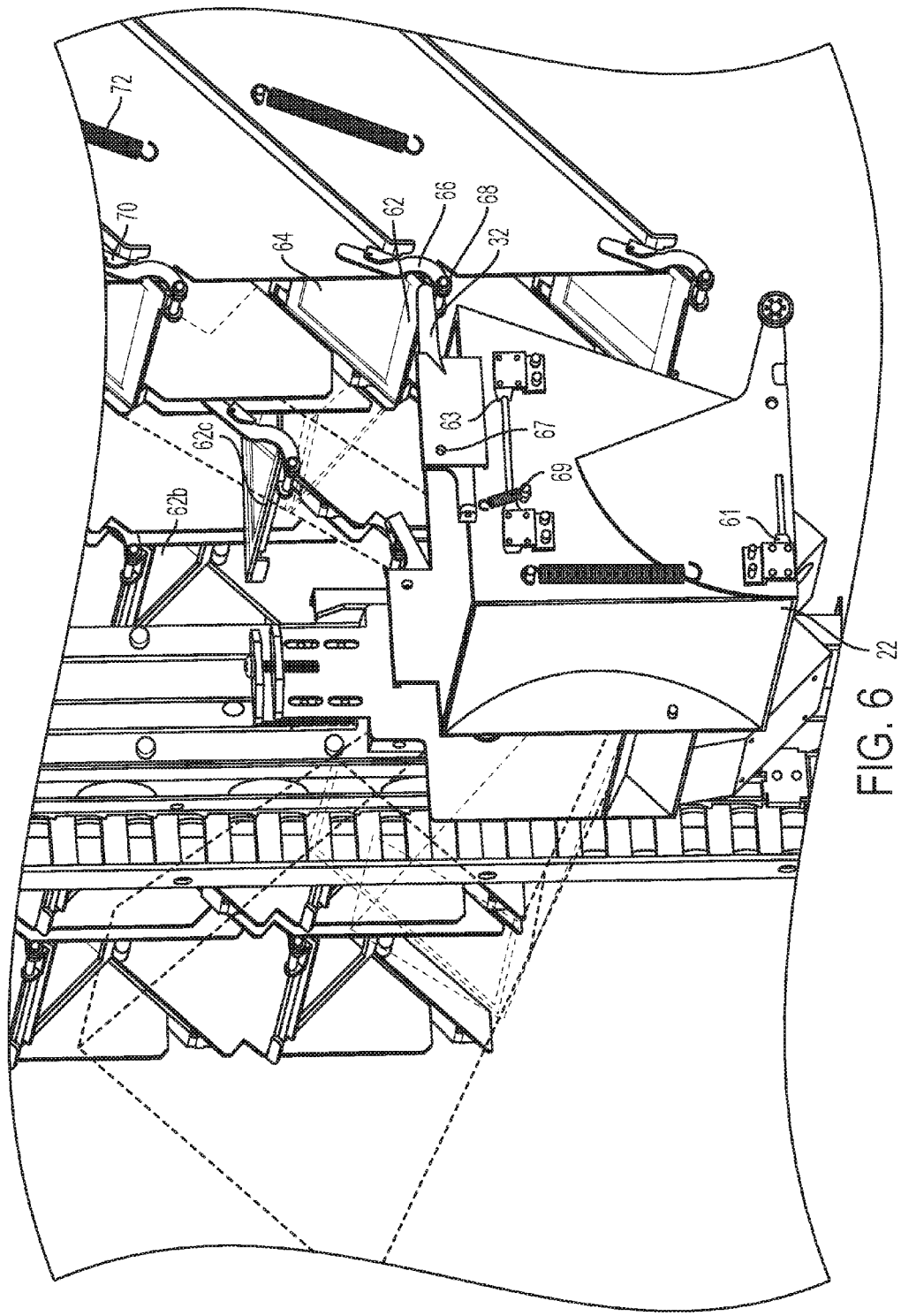
FIG. 6 illustrates an alternative front perspective view of the automated retail system of FIG. 5, showing the product delivery basket, according to embodiments of the present invention.
Figure 7:
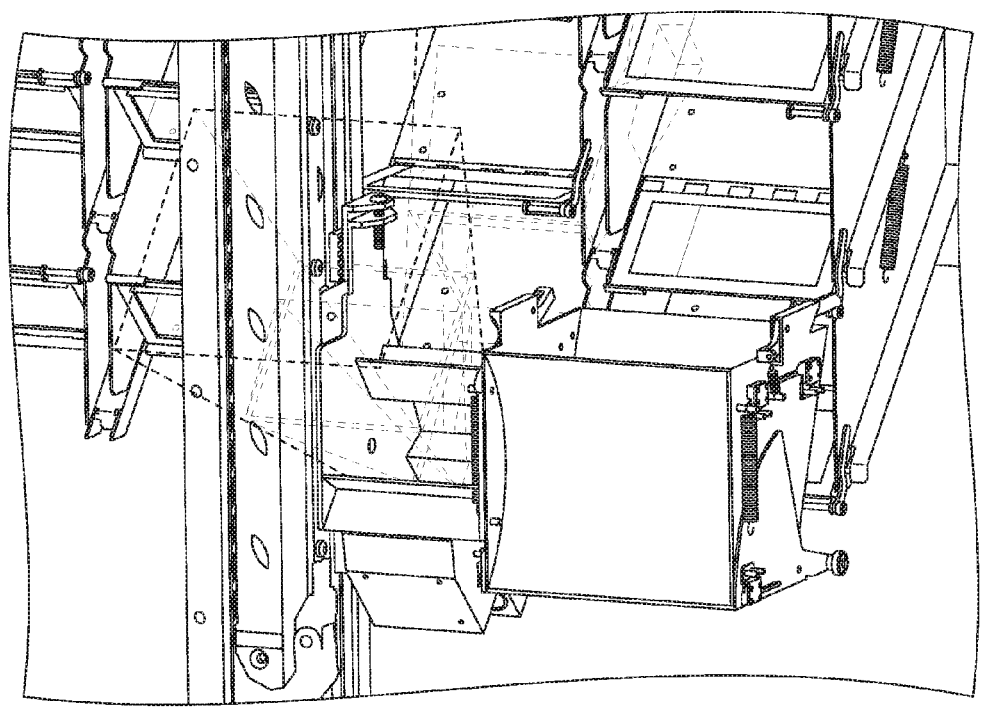
FIG. 7 illustrates an alternative front perspective view of the automated retail system of FIGS. 5 and 6, according to embodiments of the present invention.

As shown in FIG. 6, once the product is loaded into the receptacle, a door 62 prevents the product from falling out of the receptacle. The bottom surface of each receptacle may be sloped or ramped, downwardly from the back of the rack 13 toward the front of the rack 13, to facilitate product delivery. For example, this slope or ramp of each receptacle permits the product to slide easily into the delivery basket 22 once the product door 62 is opened.

FIG. 6 illustrates one way in which the delivery basket 22 may be used to open a product delivery door 62, according to embodiments of the present invention. According to embodiments of the present invention, the product delivery basket 22 moves only along the x-y plane, and does not move in the z direction (which is perpendicular to both the x and y directions). This saves cost and expense for building the system 10, and also simplifies and expedites product delivery. The product delivery basket 22 includes a door actuator 32. Door actuator 32 may be a rod that extends from the delivery basket 22 toward the product rack 12; door actuator 32 may be rigidly affixed, and/or pivotably coupled to the delivery basket 22 at pivot point 67 and biased in a downward position by one or more resilient members, for example spring 69, according to embodiments of the present invention. According to some embodiments of the present invention, door actuator 32 is not extendable or retractable in the z direction.

Each product door 62 includes a door front 64, as well as a side lever 66 pivotably coupled to the door 62. A spring 72 may be attached to the door 62 and/or side lever 66 in order to bias the product delivery door in a closed position (as demonstrated by door 62b), so that the product is retained within the receptacle by the door 62b until the door is opened by the door actuator 32. Each door 62 may also include a contact element 68, for example a freely rotating wheel 68, configured to be contacted by the door actuator 32. As seen in FIG. 6, the contact elements 68 extend into and/or beyond the same plane within which the door actuator 32 moves; therefore, the control system which controls the x-y position of the basket 22 is programmed so as not to inadvertently move the door actuator 32 into contact with the contact elements 68. When a particular item has been selected for delivery, the control system causes the delivery basket 22 to be moved to a position in which the door actuator 32 is directly above the contact element 68 corresponding to the door 62 to be opened, and then the basket 22 (and door actuator 32) are moved downwardly (in a negative y direction) such that the door actuator 32 pushes downwardly on the contact element 68 to lower the door 62. The contact element 68 may be a freely rotating wheel, and may include a rubber or other gripping surface to prevent slippage, while rotating to prevent binding as the door 62 is opened, according to embodiments of the present invention. Door 62b is depicted in a closed position, while door 62c is depicted in a partially opened position, and door 62 is depicted in a fully opened position. The doors directly above and below door 62 are also depicted in an open position, as well as door 62c in a partially open position, for illustrative purpose only; during use, normally only one door 62 is opened at any given time by the door actuator 32, according to embodiments of the present invention.

The delivery basket 22 and door actuator 32 are positioned with respect to each other such that, once the door 62 is opened, the product which was formerly held stationary behind the door 62 then slides over the door 62 (which has been opened to form a downward sloped ramp) and into the basket 22. As discussed above, the inside 42 of the basket 22 may also be sloped to as to accommodate the downward slide of the released product. After product release into the basket 22, the door actuator 32 and basket 22 may be raised to permit the door 62 to close (e.g. via spring action 72), or the door actuator 32 and basket 22 may be moved in a positive or negative x direction to slip the door actuator 32 off of the contact element 68, according to embodiments of the present invention.

Figure 8:
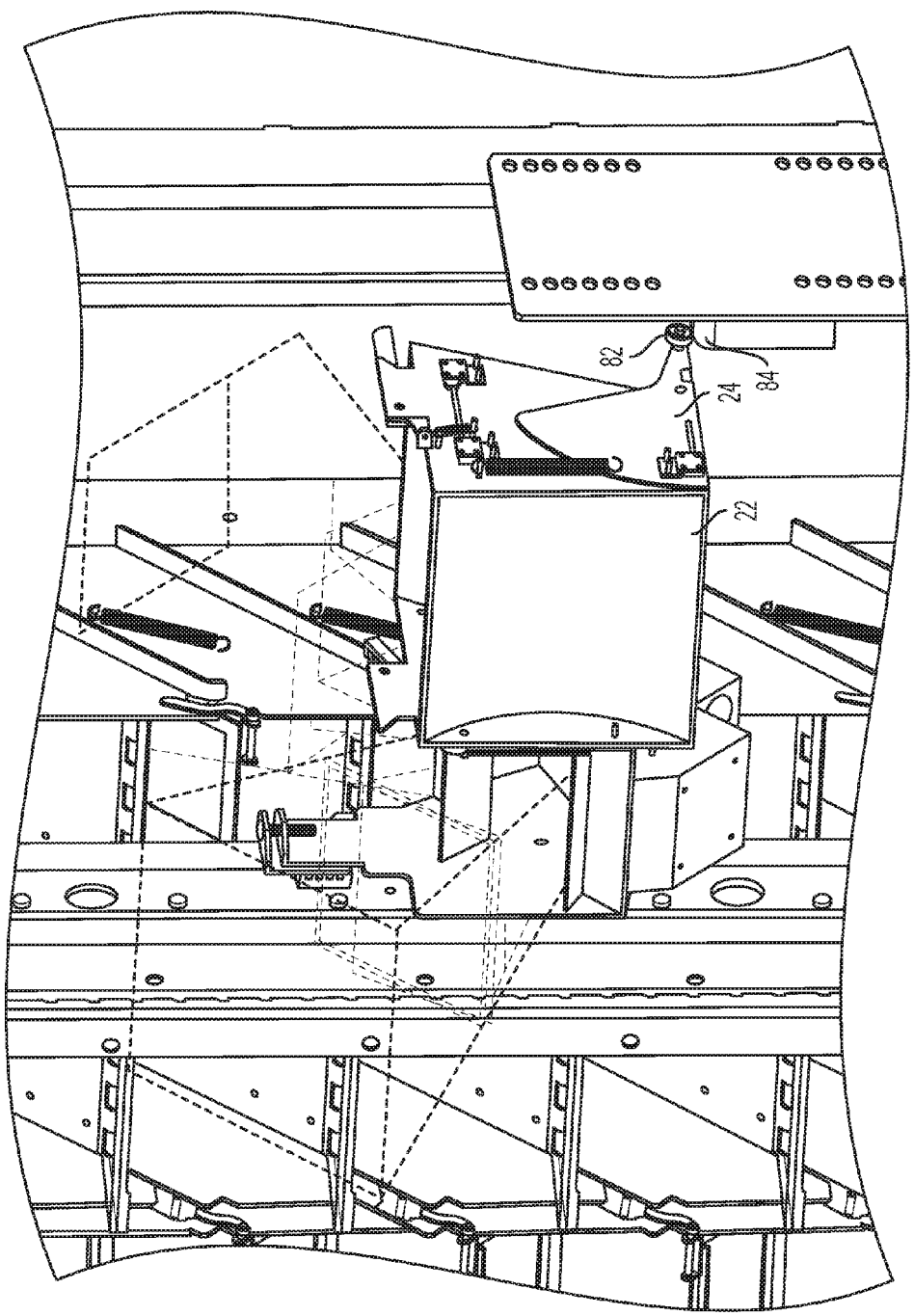
FIG. 8 illustrates a front perspective view of a product delivery basket and delivery door activation mechanism, according to embodiments of the present invention.
Figure 9:
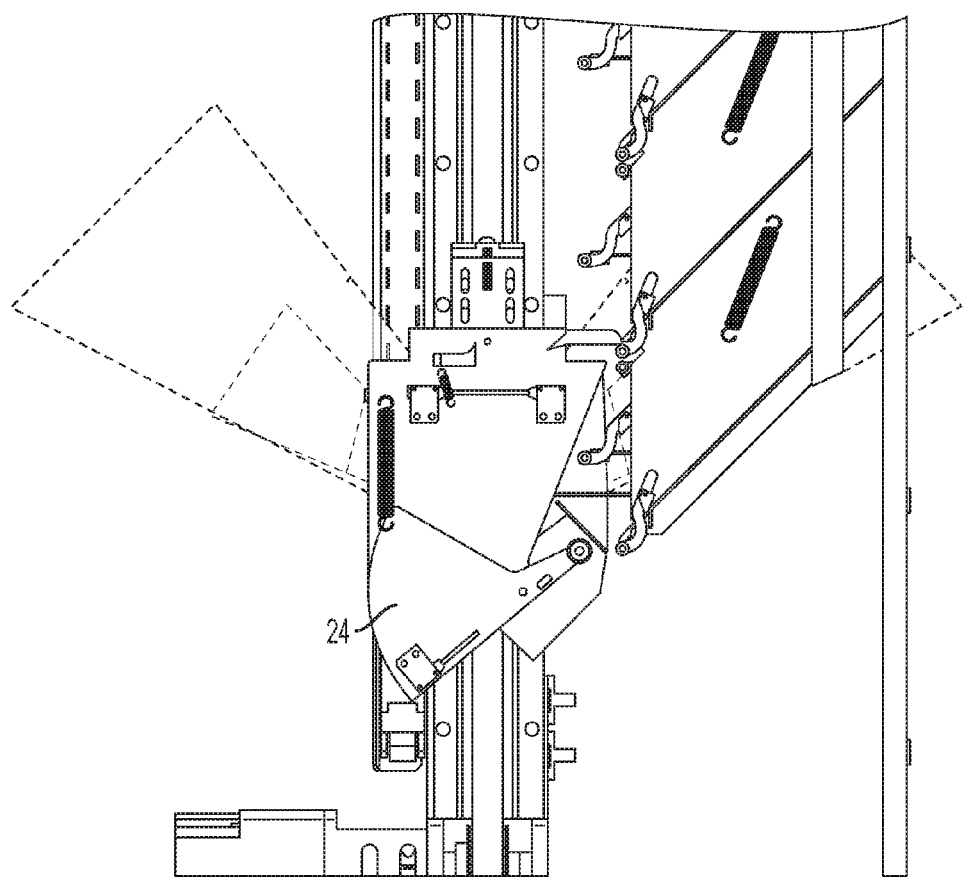
FIG. 9 illustrates a side elevation view of the product delivery basket with delivery door partially opened, according to embodiments of the present invention.
Figure 10:
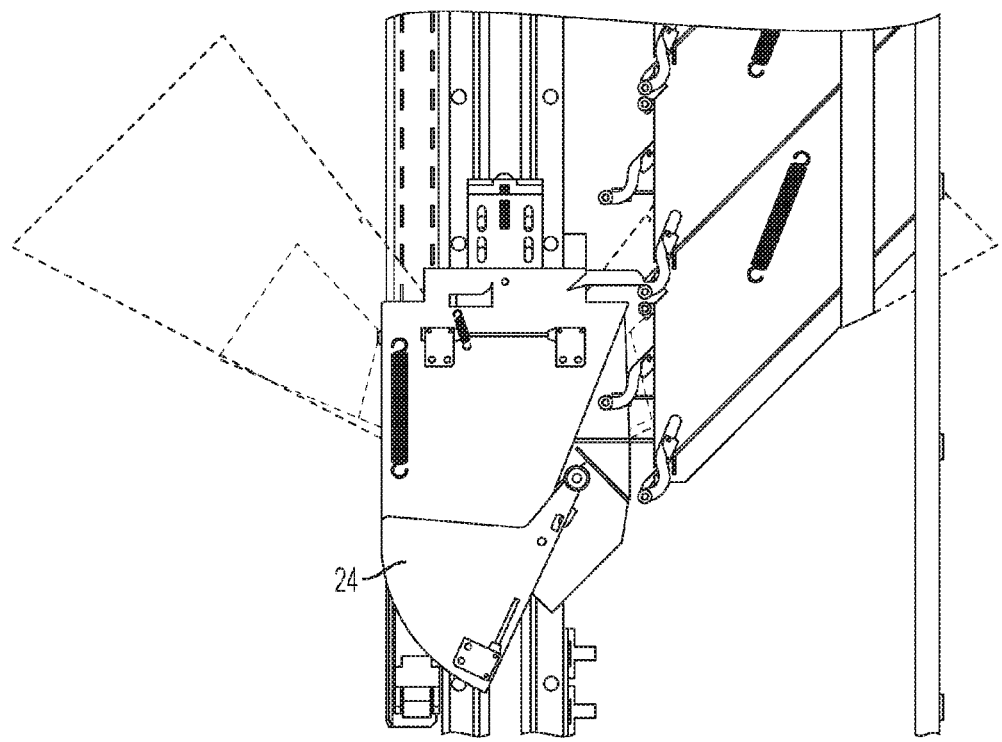
FIG. 10 illustrates a side elevation view of the product delivery basket with delivery door fully opened, according to embodiments of the present invention.
Figure 11:
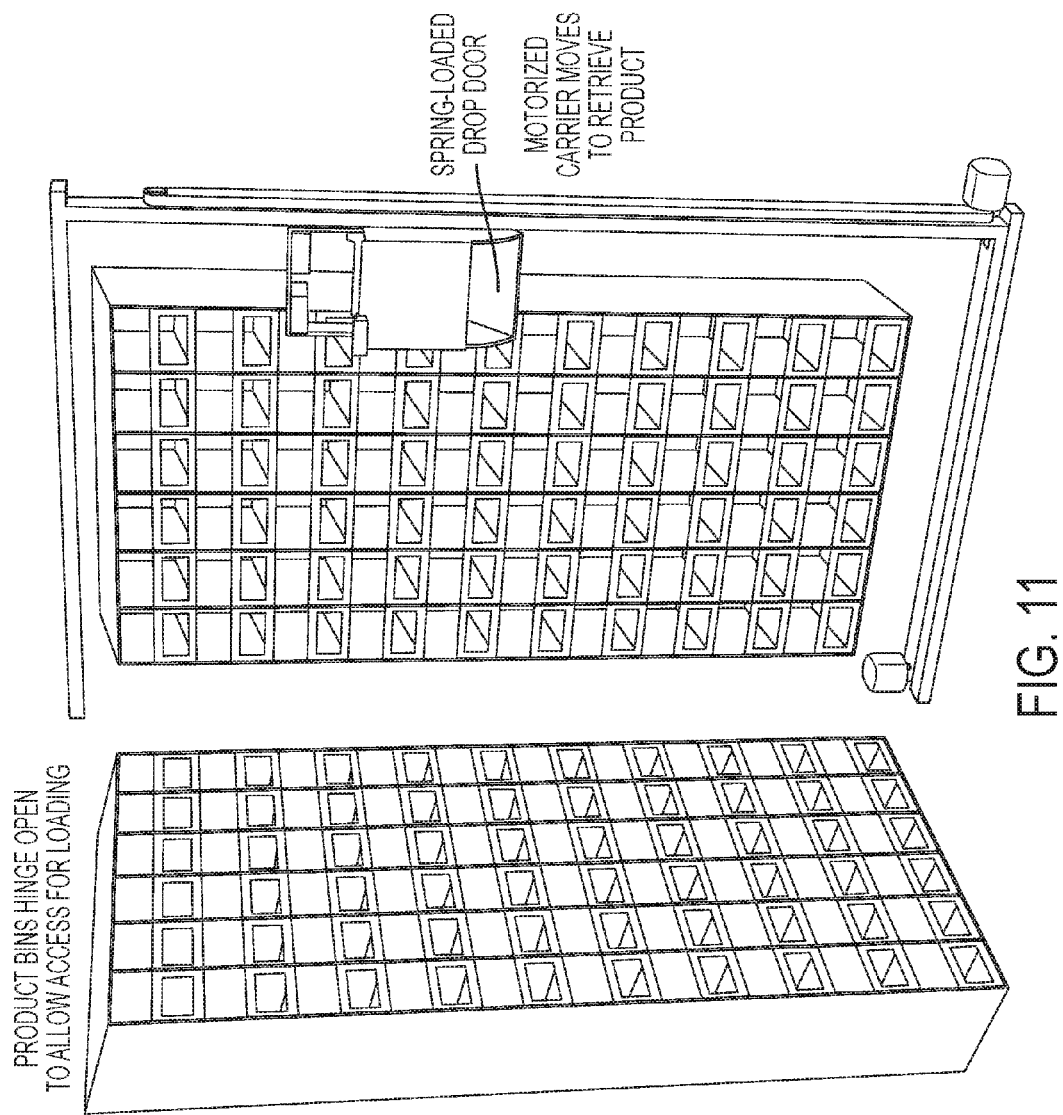
FIG. 11 illustrates a perspective view of an alternative automated retail system, according to embodiments of the present invention.
Figure 12:
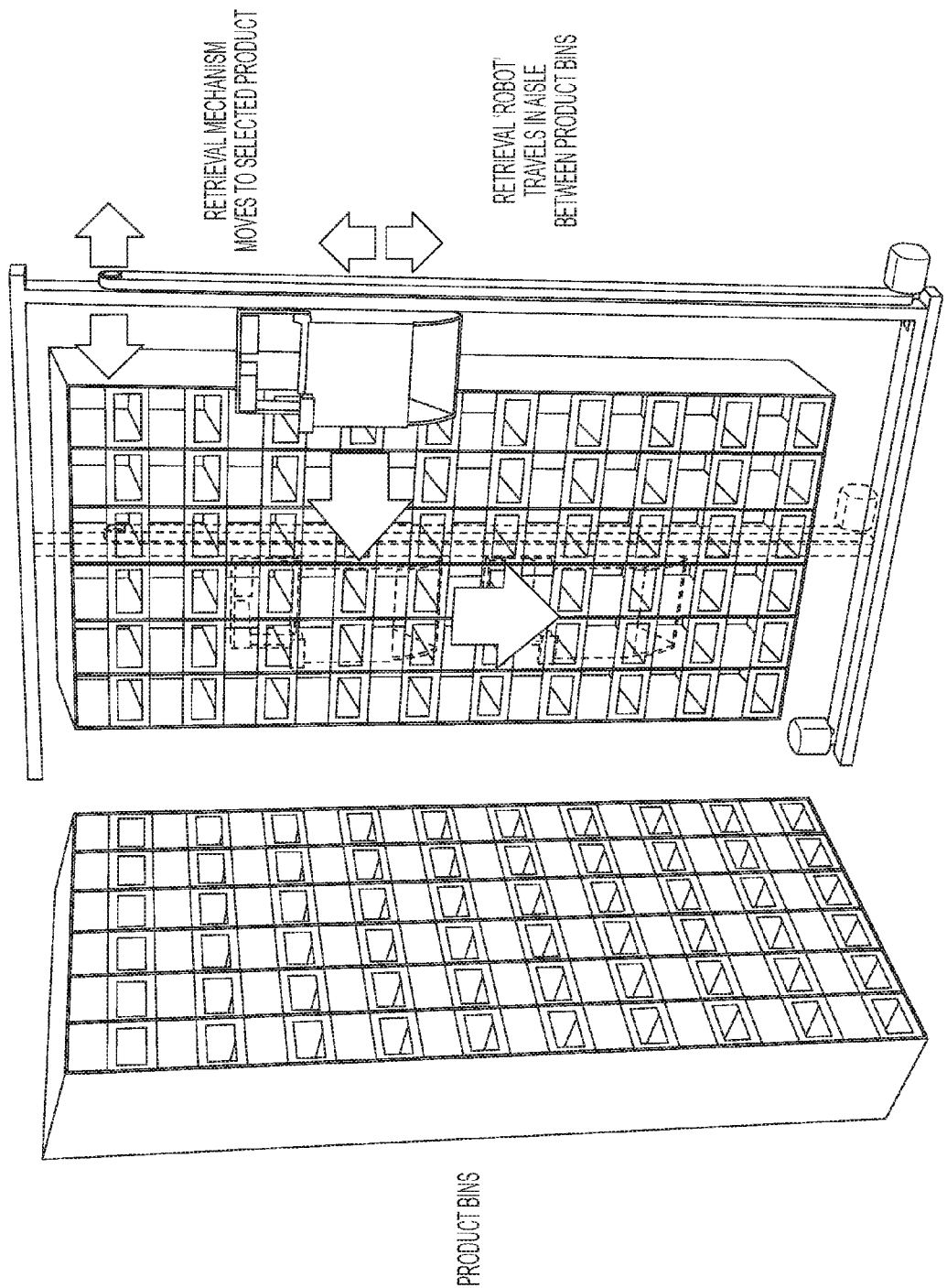
FIG. 12 illustrates a perspective view of the alternative automated retail system of FIG. 11, according to embodiments of the present invention.
Figure 13:
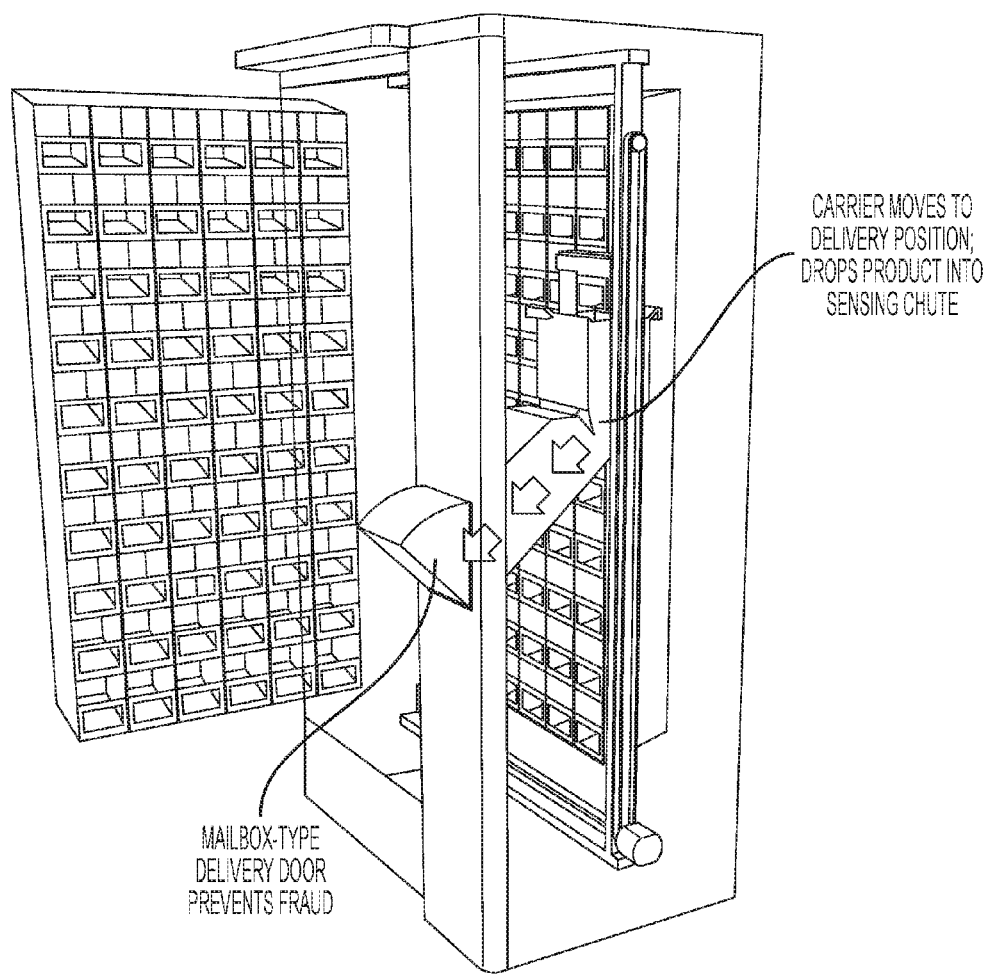
FIG. 13 illustrates a perspective view of the alternative automated retail system of FIGS. 11 and 12, according to embodiments of the present invention.
Figure 14:
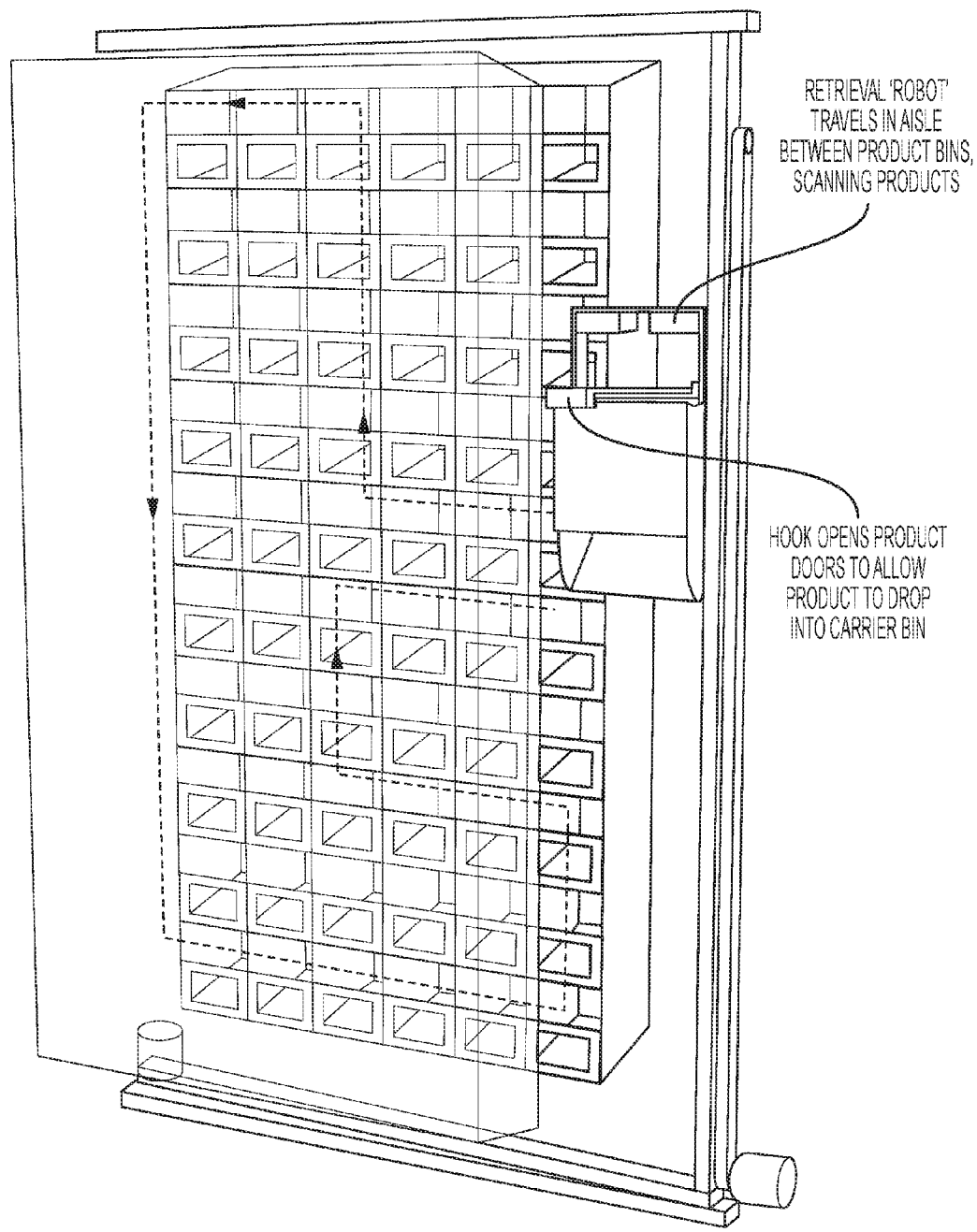
FIG. 14 illustrates a perspective view of the alternative automated retail system of FIGS. 11 to 13, according to embodiments of the present invention.

As shown in FIG. 8, once the desired product has been received into the basket 22, the basket 22 may be moved along the x-y plane until it is positioned directly above a trap door actuator 84. The trap door 24 of the basket 22 pivots about pivot point 44 (see FIG. 4), and includes a contact element 82, which may be similar to contact element 68 previously described. When the basket 22 is lowered from the position shown in FIG. 8, the contact element 82 contacts the trap door actuator 84, and the trap door 24 is opened. FIG. 9 illustrates the trap door 24 in a partially open position, and FIG. 10 illustrates the trap door 24 in a fully opened position. Once the trap door 24 is opened, the product slides or falls by gravity into the delivery chute 26, and may be retrieved by a user through a delivery door 28.

According to embodiments of the present invention, each door 62 includes a transparent window 64, which permits the scanner 36 or scanners, imagers, RFID transceivers, and/or cameras, at any desired time, to move along the x-y plane and take inventory of the automated retail system 10. This facilitates loading or stocking of the system 10 with new product, and also facilitates inventory tracking and control. When a user manually loads new products into the product rack 12, the basket 22 moves to positions corresponding to each product bin, and scanning system 36 determines the contents of each receptacle and/or location of each inventory item. This prevents the inventory personnel from having to place certain products in certain locations, and/or having to manually indicate to the system 10 the actual bin location of each product. Optionally, the scanning system 36 may be used to confirm the contents of a particular bin before the door to that bin is opened, and/or to confirm the absence of the contents of a particular bin at any time. The system 10 may also be programmed to automatically scan the inventory at certain time intervals, for example every eight hour period. The system 10 can also make a note of bins for which an inconclusive scan was performed, and create a flag for later follow-up by a technician, and to remove the problem bin from the immediately available retail inventory of the system 10.

The sensors/scanners 36 and/or 37 may also be used to sense or scan the delivery of a product from the bin into the basket 22, and/or from the basket 22 into the delivery chute 26. Other different sensors and types of sensors may also be used for these purposes. For example, each door 62 may include a door position sensor 70 (see FIG. 6) configured to convey a signal indicating a position of the door 62 to the control system. This may be a simple "open/closed" indication, and/or may include an incremental or relative position of the door, according to embodiments of the present invention. Other optical, camera, imager, laser, and/or RFID sensors may be included in, on, and/or near the basket 22 in order to sense or confirm product location and/or delivery. For example, sensor 63 on the basket 22 may be used to sense the passage of a product from within a bin in the rack 12 to within the basket 22, and sensor 61 on the trap door 24 may be used to sense the passage of a product from within the basket 22, down the trap door 24, and into the delivery chute 26, according to embodiments of the present invention.

Although a particular trap door 24 mechanism is described herein, other trap door-type mechanisms, as well as other non-trap door-type mechanisms, may be used to retain the product on or within the basket 22 between the time the basket 22 receives the product and the time the basket 22 conveys the product to the delivery chute 26, according to embodiments of the present invention. For example, the basket 22 may include a bottom which slides out horizontally from under the basket 22 to release a product therein.

Although FIGS. 5-10 illustrate the door opening and product retrieval from the rear product rack 12, the basket 22 and rail system may also be used to open doors and retrieve products from the front product rack 14 in a similar manner, according to embodiments of the present invention. The basket 22 may include another door actuator extending from the basket 22 in a direction toward the front product rack 14, similar to how the door actuator 32 extends toward the rear product rack 12. According to embodiments of the present invention, the vertical and/or horizontal placement of the bins of the front product rack 14 may be offset in an x and/or y direction with respect to the corresponding placement of the bins of the rear product rack 12, to facilitate movement of the basket 22. According to other embodiments of the present invention, the bins of the front product rack 14 are not offset with respect to the bins of the rear product rack 12, and the basket 22 and door actuators 32 are simply maneuvered around the contact elements 68 of each door to avoid accidental collisions as the basket 22 is moved along the x-y plane.

FIGS. 11-14 illustrate operation of an automated retail system similar to system 10, according to embodiments of the present invention.

Figure 15:
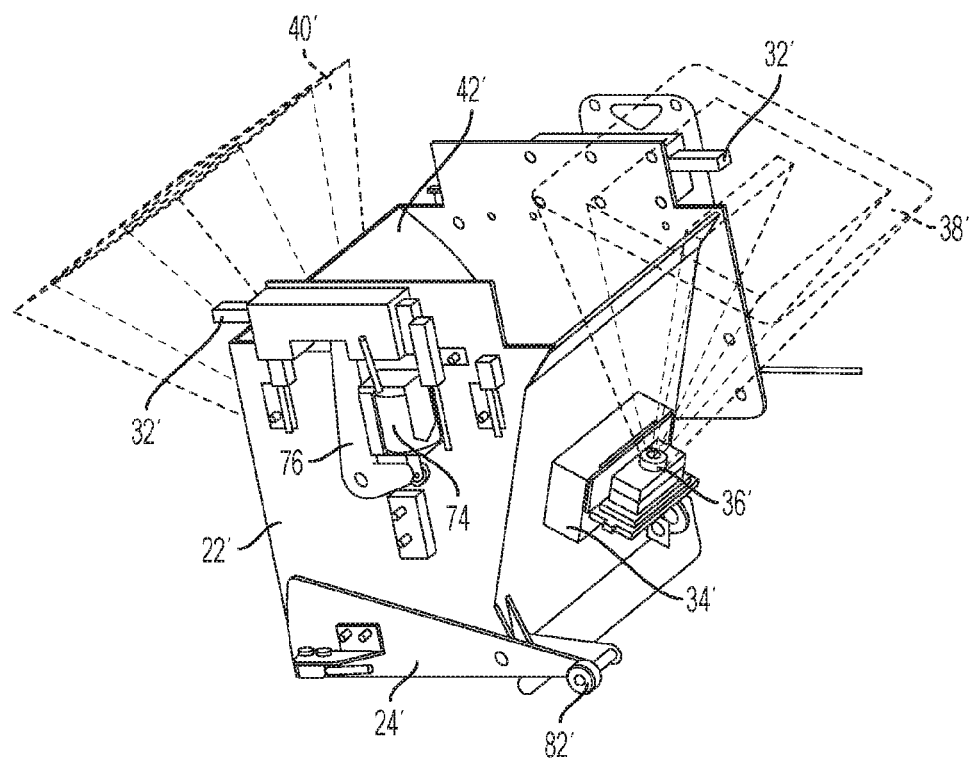
FIG. 15 illustrates a perspective view of a product delivery basket, according to embodiments of the present invention.

FIG. 15 illustrates a perspective view of a product delivery basket 22', according to embodiments of the present invention. Product delivery basket 22' may include some or all of the features or characteristics described with respect to product delivery basket 22, and product delivery basket 22 may include some or all of the features or characteristics described with respect to product delivery basket 22', according to embodiments of the present invention. Product delivery basket 22' includes a basket trap door 24', which extends under the bottom of the product delivery basket 22' in a closed configuration, and a door actuator 32', according to embodiments of the present invention. Instead of having a laterally adjacent sensor mount 34 like basket 22, the sensor mounts 34' of basket 22' are on the basket 22' itself, according to embodiments of the present invention. A product identification sensor 36' is located on the sensor mount 34', and a similar product identification sensor may be located on another sensor mount on the other side of the basket 22', according to embodiments of the present invention. Product identification sensors 36' may be laser-based bar code scanners, camera or imaging sensors, and/or radio frequency identification (RFID) sensors, according to embodiments of the present invention. The superimposed projection cones 38', 40' are included to illustrate an exemplary three-dimensional range of the sensors 36', according to embodiments of the present invention.

Basket 22' may operate similarly to basket 22, according to embodiments of the present invention. According to some embodiments of the present invention, the door actuators 32' are retractable and extendable, to further facilitate the navigation of the basket in the x-y coordinate system over the various compartments. For example, when the basket 22' is moved along the gantry system in the x-y directions, the door actuators 32' may be retracted so that they do not catch on or otherwise interfere with the hardware of the display rack (e.g. the door actuators or the compartments themselves). The door actuators 32' may be extended when a particular compartment is selected for opening, according to embodiments of the present invention. Although the basket 22' is shown with two opposing door actuators 32', the basket 22' may alternatively include only one door actuator 32', or more than two door actuators 32', depending on the arrangement of the front and/or back panels and the particular door opening mechanisms used. The door actuators 32' may be actuated with an electronically controlled solenoid 74 and pivot arm 76, or with various other electronically controlled or other mechanisms, according to embodiments of the present invention. Basket 22' also includes a trap door 24' and contact element 82' which operate similarly to trap door 24 and contact element 82, according to embodiments of the present invention.

Figure 16:
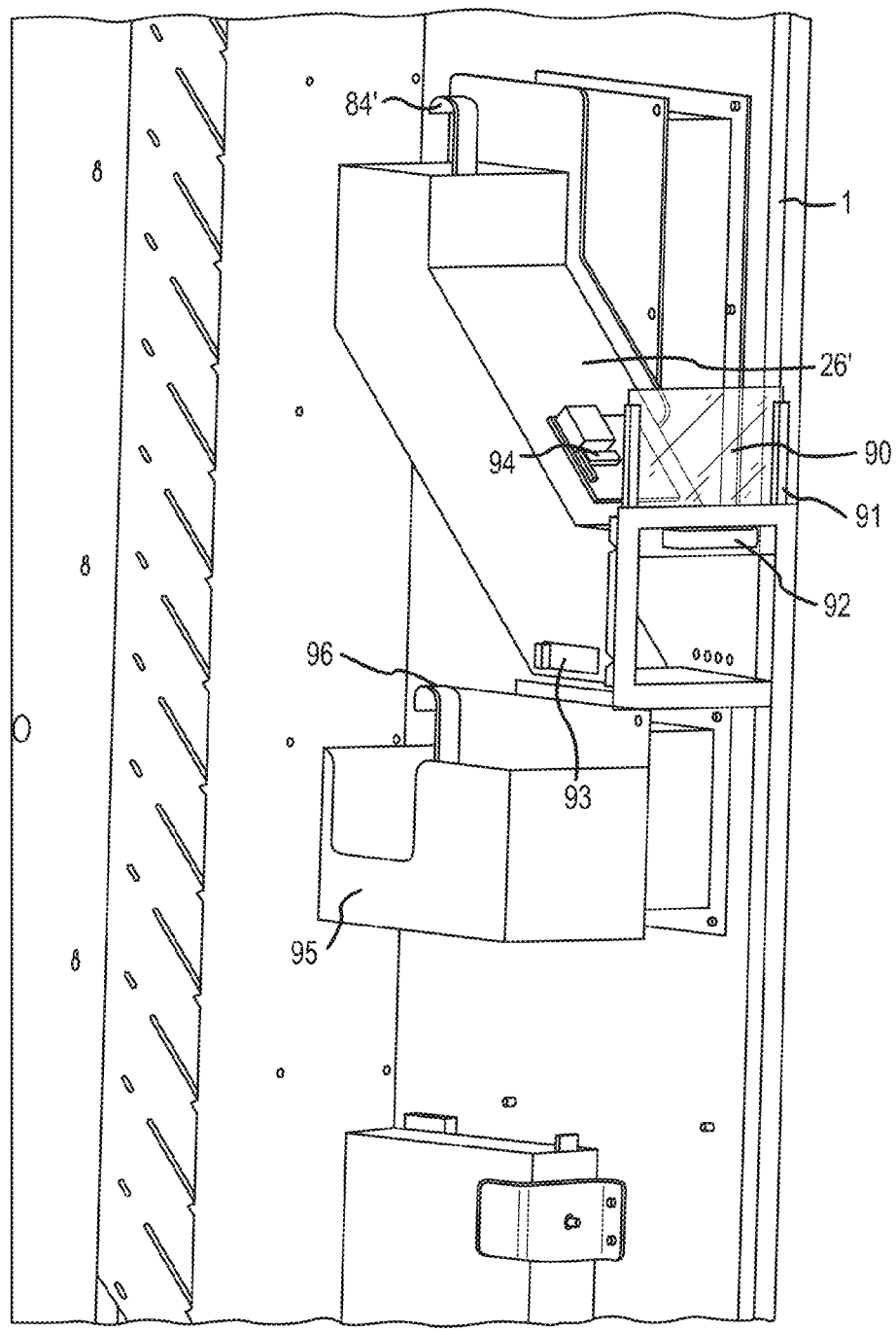
FIG. 16 illustrates a perspective view of an inside of an alternative automated retail system enclosure, showing a product delivery chute, according to embodiments of the present invention.

FIG. 16 illustrates a perspective view of an inside of an alternative automated retail system enclosure or housing 1, showing a product delivery chute 26', according to embodiments of the present invention. Product delivery chute 26' and trap door actuator 84' operate similarly to product delivery chute 26 and trap door actuator 84, according to embodiments of the present invention. The basket 22' may be moved to just above the trap door actuator 84' and lowered until contact element 82' catches on trap door actuator 84', thereby opening the trap door 24' and causing the dispensed product to fall from the basket 22' into the delivery chute 26', according to embodiments of the present invention. The delivery chute 26' may include one or more lighting and/or sensing apparatus 93, 94 configured to identify the receipt of a product at the bottom of the chute 26' and/or to scan the product at the bottom of the chute 26' to identify and/or confirm the identity of the product, according to embodiments of the present invention. For example, system 93 may create a light curtain across the delivery chamber which is interrupted when a product arrives. The delivery chute 26' may include a delivery door 90, for example a door 90 which slides up and down on tracks 91 and has a handle 92 for lifting the door, according to embodiments of the present invention. According to embodiments of the present invention, the opening of door 90 is locked until a product is ready to be retrieved from the chute 26'.

FIG. 16 also shows an auxiliary bin 95. Auxiliary bin 95 may also have a trap door actuator 84'. Products may be delivered by the basket 22' to the auxiliary bin 95 in much the same way that they are delivered to the delivery chute 26', by positioning the basket 22' over the door actuator 96 and lowering the basket 22' until contact element 82' catches on the door actuator 96, thereby opening the trap door 24' and causing any product within the basket 22' to fall into the auxiliary bin 95. The auxiliary bin 95 may be used to receive items which have expired, items which require additional attention before being dispensed, and/or items to be disposed of, for example. The auxiliary bin 95 may also be used by basket 22' to open the trap door 24' in situations in which the control system for the basket 22' cannot determine the identity of a particular product and/or cannot determine whether a product is in the basket 22'. The auxiliary bin 95 may also be used to release products in cases in which the basket 22' detects or suspects the presence of more than one or of too many products within the basket 22', to prevent the dispensation of too many products or unknown products, according to embodiments of the present invention.

Figure 17:
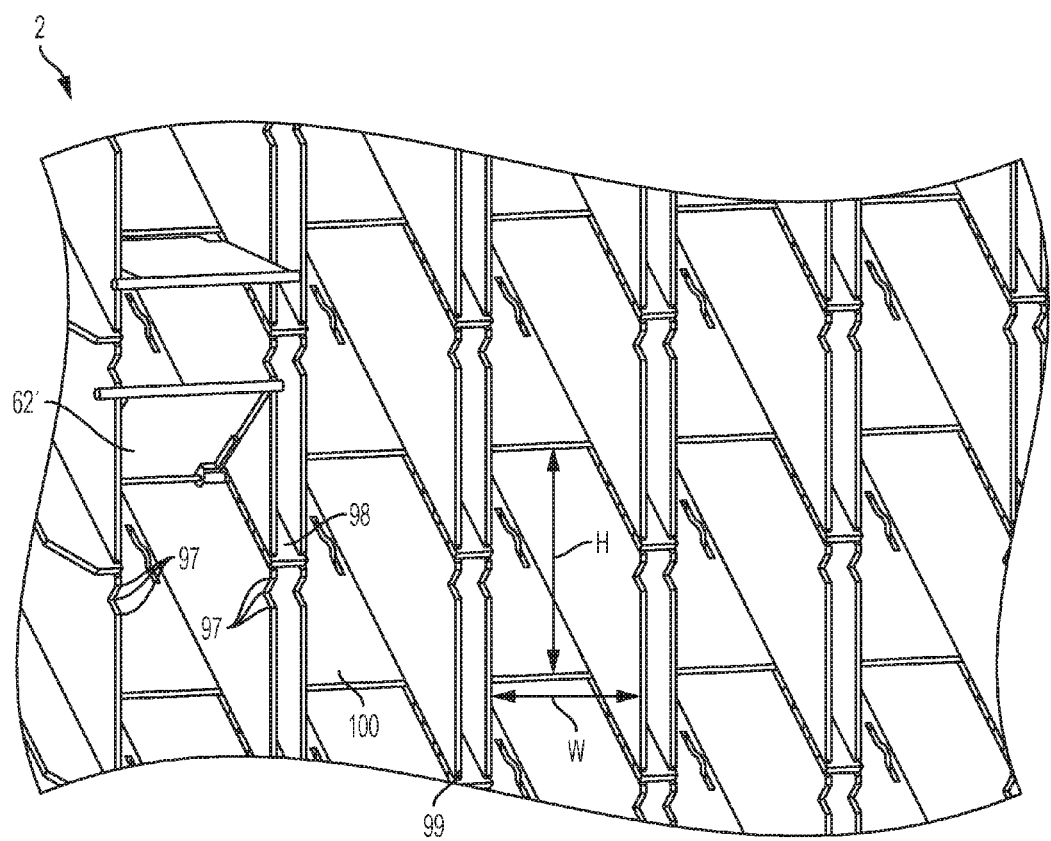
FIG. 17 illustrates a front perspective view of a product rack for an automated retail system, according to embodiments of the present invention.

FIG. 17 illustrates a front perspective view of a product rack 2 for an automated retail system, according to embodiments of the present invention. The rack 2 includes compartments as described above, with each compartment having a width W and a height H, according to embodiments of the present invention. The rack 2 may be formed of various plates, which may be metal or plastic or other rigid or semi-rigid material. For example, the bottom of each chamber may be formed of a bottom plate 100, and the sides of each chamber may be formed of vertical plates 99. A spacer plate 98 may be located between adjacent vertical panels 99, and may in some cases operate as a stop for the door 62' when the door 62' is fully opened, according to embodiments of the present invention. These sheets or plates 98, 99, 100 may be used to create compartments which are customizable in size and easy to assemble. As described above, the plates 100 may interface with the vertical plates 99 so as to create a downward slope to permit products sitting on top of the plate 100 in each compartment to slide down over the door 62' when the door 62' is opened, according to embodiments of the present invention.

The control system which controls the position of the basket 22 or 22' uses sensors 36, 37, 36' which may also be configured to identify position or relative position. Using these sensors, the control system can identify the location of a compartment and determine the location of the basket 22 or 22' relative to the compartment. The sensor system may be configured to identify edges, for example the left-most and/or right-most edges of the vertical plates 99, which permit the control system to position the basket 22, 22' correctly in the x dimension. The sensor system may also be configured to identify one or more edges 97 formed as notches or breaks in the vertical plates 99, in order to permit the control system to position the basket 22, 22' correctly in the y dimension. As such, the same basket 22, 22' and sensor systems may be used with a wide variety of different compartment sizes and configurations. The basket 22, 22' and sensor systems may also be used to scan and deliver items from a rack which includes differently-sized compartments on the same rack, using this position identification technology. This also permits the same programming to be used for different rack configurations, thereby decreasing the cost of such systems and making them easier to physically update and/or configure.

According to some embodiments, the sensor system can scan the contents of a compartment while at the same time identifying one or more indicators of the location or boundary of the compartment. According to some embodiments, multiple baskets 22, 22' may be used simultaneously or independently for the same or different products racks within the overall system.

The automated retail system may include an initialization sequence or protocol for the control system of the basket 22 or 22', according to embodiments of the present invention. The basket 22 may begin in a "home" or starting position, for example in the upper or lower left-hand or right-hand corner of a particular product rack 2, and may then use the position sensor as the basket 22 moves to the right or left to count the number of vertical plates 99 until it reaches a stop (either virtual or actual), and may also move up or down to count the number of vertical edge indicators 97 until it reaches a stop (either virtual or actual), to create an internal "map" of the location of each compartment. This initialization sequence may be performed upon machine startup, or at regularly scheduled intervals, or when the system detects a fault state or otherwise encounters an error. The scanning of each product in each compartment may be done simultaneously with or at a different time from this initialization sequence. Also, the initialization sequence may be performed for one of the front and back racks and then the other, or alternatively with sensors on both sides of basket 22, may be performed simultaneously for the front and back racks during the same pass of the basket 22. An initialization sequence for basket 22' may be controlled in a similar fashion.

According to some embodiments of the present invention, it may be desirable to affirmatively indicate to the scanners or sensors 36, 37, 36' when there is no item present in a particular compartment. The doors 62' of the compartments may be transparent to permit the bar code or other identifier on an item to be scanned through the door. When the basket 22 does not detect any item within the compartment, it may be configured to "jiggle" back and forth and/or up and down for a short period of time in order to increase the chances of scanning an item in the compartment. If no item is detected, then the controller may determine that no item is present in the compartment. According to some embodiments of the present invention, the controller then causes the basket 22 or 22' to open that particular compartment, and to deliver any contents to the auxiliary bin 95. According to some embodiments of the present invention, a special bar code or other indicator is placed on the top of the plate 100, such that when an item is present in the compartment the item covers such special bar code or other indicator, such that the scanner scans only the item in the compartment, and such that when an item is not present in the compartment, the scanner scans the special bar code or other indicator which indicates that the compartment is empty. Such a special bar code or other indicator may alternatively be placed on the outside or inside of the door 62, 62', and operate in a similar fashion.

Figure 18:
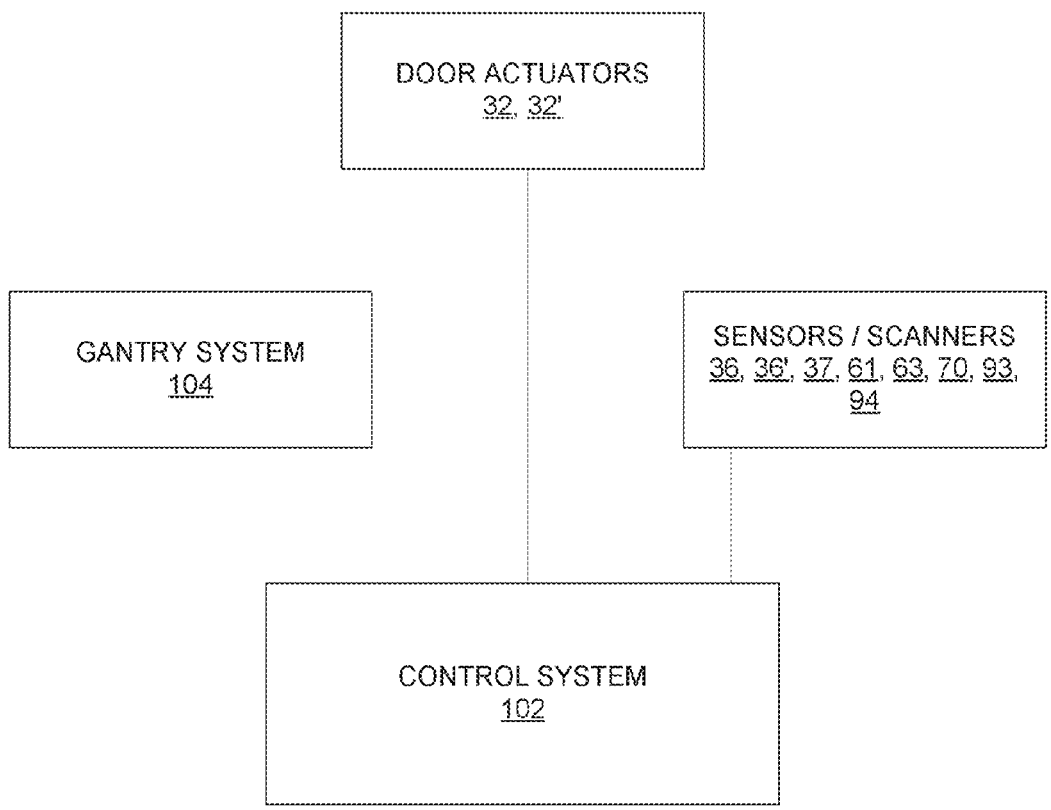
FIG. 18 illustrates an automated retail system, according to embodiments of the present invention.

FIG. 18 illustrates an automated retail system, according to embodiments of the present invention. A control system 102 is communicably coupled to the gantry system 104, actuators or other machinery (e.g. actuators 32, 32'), and sensors and/or scanners or other sensing devices (e.g. 36, 36', 37, 61, 63, 70, 93, and 94). The gantry system 104 may include rail system 16, 18, 20 and associated cables, motors, electronics, and other hardware for moving the delivery basket 22 along the horizontal axis x and the vertical axis y, according to embodiments of the present invention. Control system 102 may be a personal computer or other computing device, according to embodiments of the present invention.

The control system 102 is capable of executing instructions to perform the steps and methods described herein, in whatever order, and excluding one or more steps and/or including one or more additional steps or repetitions of steps, according to embodiments of the present invention. The control system 102 receives information or signals and, based on such information or signals, sends out control signals to cause the gantry system 104, actuators 32, 32', and other hardware to move accordingly, as described herein. The control system may also receive information from other hardware, not shown, for example a user interface touchscreen which receives selections from users of products to retrieve from compartments. The control system 102 may also rely on other sensors or signals not expressly shown, but which are apparent to one of ordinary skill in the art based on the present disclosure. For example, positional sensors may be used to provide the control system 102 with the two-dimensional (or three-dimensional) position of any piece of hardware described herein.

When a customer or requester indicates to the control system 102 that a particular product or item is desired, the control system 102 checks its database or listing of inventory based on its last scanning routine and/or initialization sequence. The control system 102 may find multiple matches for the product or the type of product requested. The control system 102 then controls the delivery basket 22 to send it, via the gantry system 104, to a particular compartment holding the particular product that has been requested. According to embodiments of the present invention, the scanner 36, 37 then scans the contents of the compartment again to verify again that the particular product is actually in the compartment. Systems which rely on manual and/or pre-positioned and/or pre-programmed inventory information do not have this capability, to confirm the presence and identity of the product just prior to dispensing. Once the product is verified, the door 62 to the compartment is opened, and the product is received in the delivery basket 22, at which point it may then be scanned again, or a different kind of sensor may be used to sense that the product has entered the basket 22, according to embodiments of the present invention. As such, embodiments of the present invention include an ability to determine the size, and layout of a customized grid of compartments, on one or both of a front compartment rack and a rear compartment rack, and scan and record/update the contents of each compartment. This may be done not only upon initialization or startup, but also after restocking, and also at any point in time. Also, individual compartments can be selectively scanned to confirm their contents, for example just prior to vending the product or otherwise opening the compartment's door. This automated inventory control reduces system errors, and also automates the process of taking inventory of the particular rack or racks or set of compartments.

Figure 19:
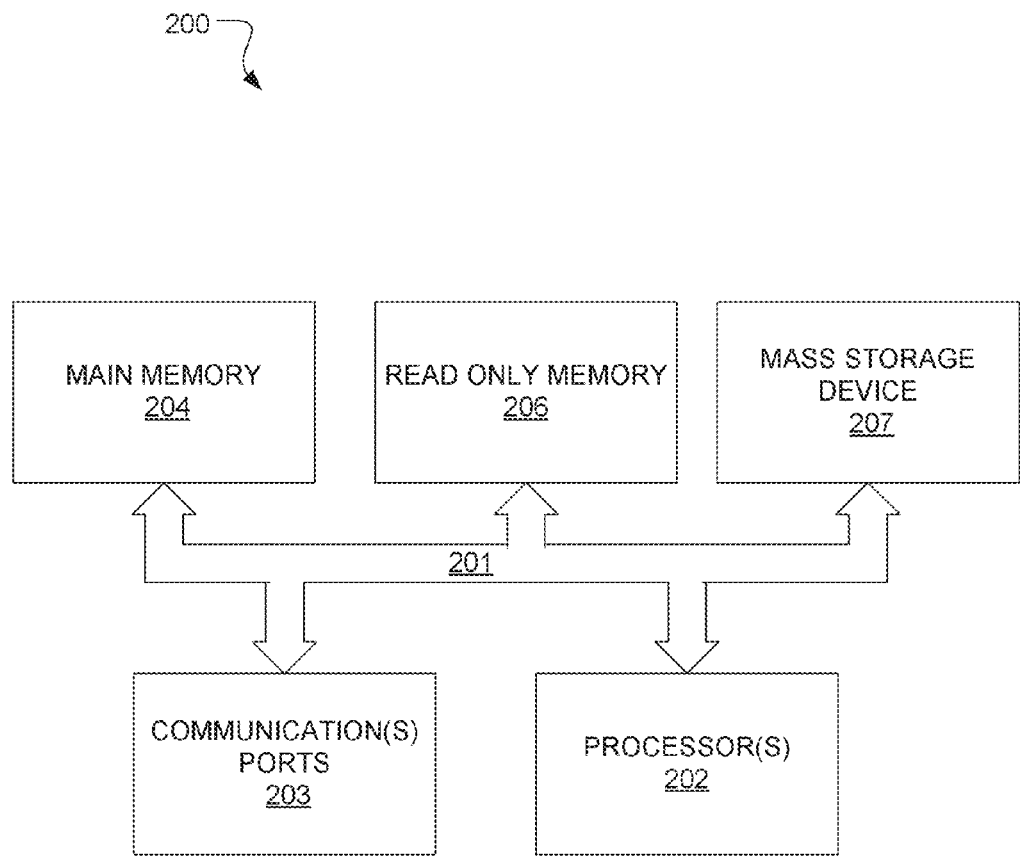
FIG. 19 illustrates a computer system, according to embodiments of the present invention.

FIG. 19 is an example of a computer system 200 with which embodiments of the present invention may be utilized. Computer system 200 represents an exemplary computer, which may operate as controller 102 in order to receive inputs (e.g. from sensors) and/or provide outputs (e.g. to control the gantry system and/or door actuator, among others). In this simplified example, the computer system 200 comprises a bus 201 or other communication means for communicating data and control information, and one or more processing devices 202, such as a well known processor, Application Specific Integrated Circuit (ASIC), a field programmable gate array (FPGA), or the like, coupled with bus 201.

In this simplified embodiment, computer system 200 further comprises a random access memory (RAM) or other dynamic storage device (referred to as main memory 204), coupled to bus 201 for storing information and instructions to be executed by processing device 202. Main memory 204 also may be used for storing temporary variables or other intermediate information during execution of instructions by processor(s) 202.

Computer system 200 can also include a read only memory (ROM) 206 and/or other static storage device coupled to bus 201 for storing static information and instructions for processing device 202. A mass storage device 207, such as a magnetic disk or optical disc and its corresponding drive, may also be coupled to bus 201 for storing instructions and information, such as configuration files, a key store and registration database, and the like.

One or more communication ports 203 may also be coupled to bus 201 for supporting network connections and communication of information to/from the computer system 200 by way of a communication network, such as a Local Area Network (LAN), Wide Area Network (WAN), or the Internet, for example. The communication ports 203 may include various combinations of well-known interfaces, such as one or more modems to provide network access, one or more 10/100 Ethernet ports, one or more Gigabit Ethernet ports (fiber and/or copper), or other well-known network interfaces commonly used in internetwork environments. In any event, in this manner, the computer system 200 may be coupled to a number of other network devices, communication devices, clients, NTMs, and/or servers via a conventional communication network infrastructure.

Optionally, operator and administrative interfaces (not shown), such as a display, keyboard, and a cursor control device, may also be coupled to bus 201 to support direct operator interaction with computer system 200. Other operator and administrative interfaces can be provided through network connections connected through communication ports 203. Finally, removable storage media (not shown), such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 201 via corresponding drives, ports or slots.

According to some embodiments of the present invention, the system 10 includes a system 300 for receiving objects. FIGS. 20-25 illustrate a system 300 for receiving objects. System 300 may be used independently, and/or may be used in conjunction with system 10, for example on the same kiosk or machine. For example, the system 300 may be used to receive used objects, for dispensing and/or recycling. As one example, the system 300 may be used to receive old or used versions of products which are also vended in their new or refurbished form by the system 10.

When objects are received by system 300, system 300, or a related control system 102 to which system 300 may be communicably coupled, may perform an audit operation to create a record about the product received. This information may be used either concurrently or independently at a later time to determine the type of product or object received, its identity, its status, its shape, its type, and/or other information about the object. For example, this documentation may include a photograph of the received object. Such information may be stored along with other information about the particular transaction for which the object was received. For example, if a person used system 10 or system 300 to provide a recyclable object and obtain payment for the recyclable object, if it was determined that the wrong kind of object was received by system 300, a person could look back through the compilation of photographs of objects to determine the identity of the person or account holder who provided the incorrect item.

Figure 20:
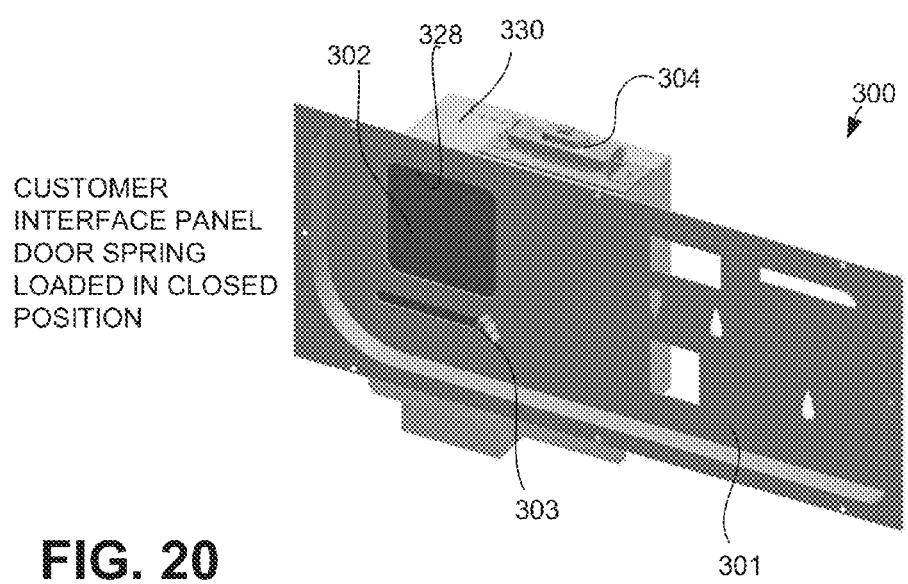
FIG. 20 illustrates a front perspective view of an object receiving system with a door in a closed position, according to embodiments of the present invention.
Figure 21:
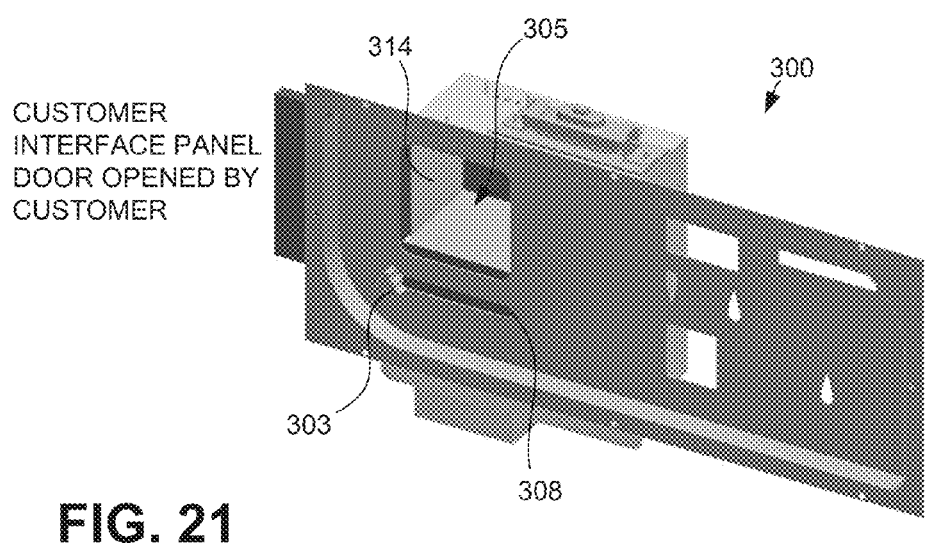
FIG. 21 illustrates the object receiving system of FIG. 20, with the door in an open position, according to embodiments of the present invention.

System 300 includes a customer interface panel 301, which may be a housing 12, 14 or the like, into which an object receiving window 328 is formed. A knob 303 is coupled to a door 302, and the knob 303 may be slid in order to open the door 302. Door 302 is spring loaded into a normally closed position, as illustrated in FIG. 20, according to embodiments of the present invention. When a user pushes the knob 303, for example to the left as shown in FIG. 21 (may alternatively be configured for pushing to the right), the door 302 opens to permit insertion of an object into the object receiving area 305. The object receiving area 305 is part of the housing 330. The housing 330 also includes an object auditing area 306 and an object drop chute 324. The door 302 and/or the knob 303 may be spring loaded or otherwise biased to the door closed position as shown in FIG. 20, according to embodiments of the present invention. The knob 303 may include a neck or shaft that rides or slides along a slot 308 formed in the customer interface panel 301, according to embodiments of the present invention.

Figure 22:
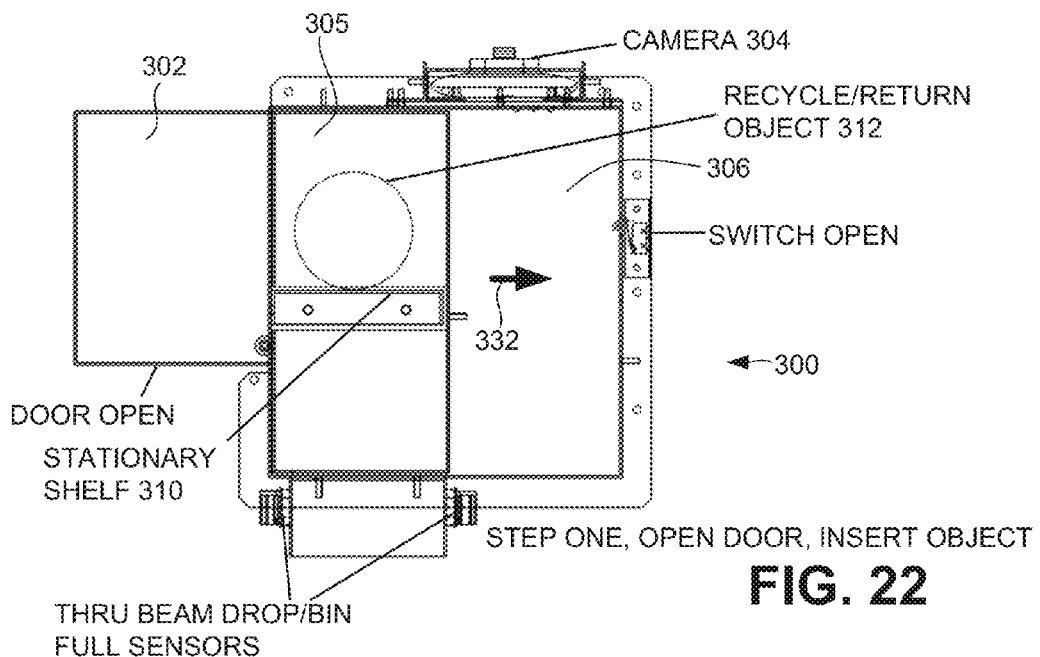
FIG. 22 illustrates a front elevation view of an inside of the object receiving system of FIGS. 20 and 21 with the customer interface panel removed and the door open, according to embodiments of the present invention.
Figure 23:
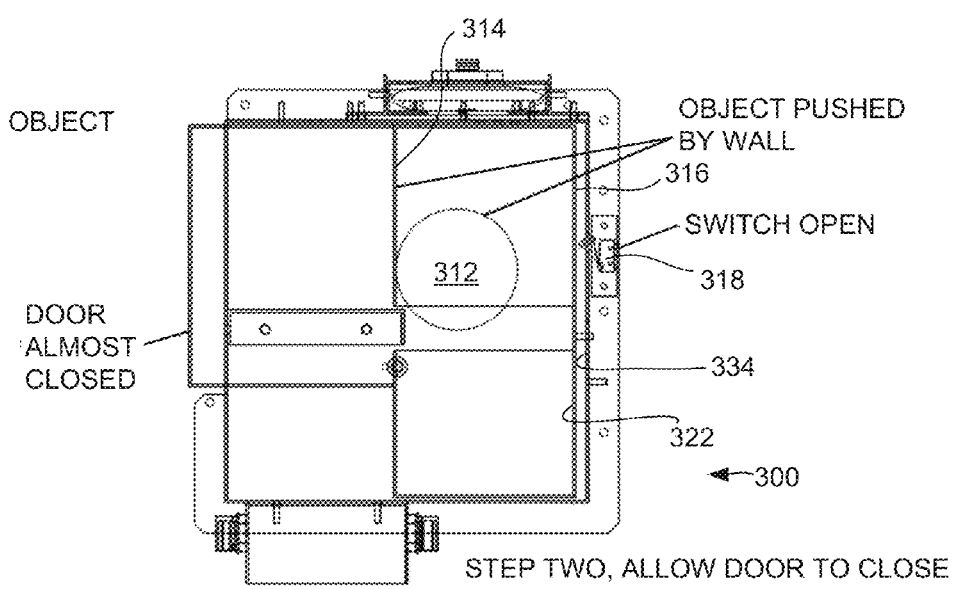
FIG. 23 illustrates a front elevation view of the object receiving system of FIGS. 20-22 with the door in a mostly closed position, according to embodiments of the present invention.
Figure 24:
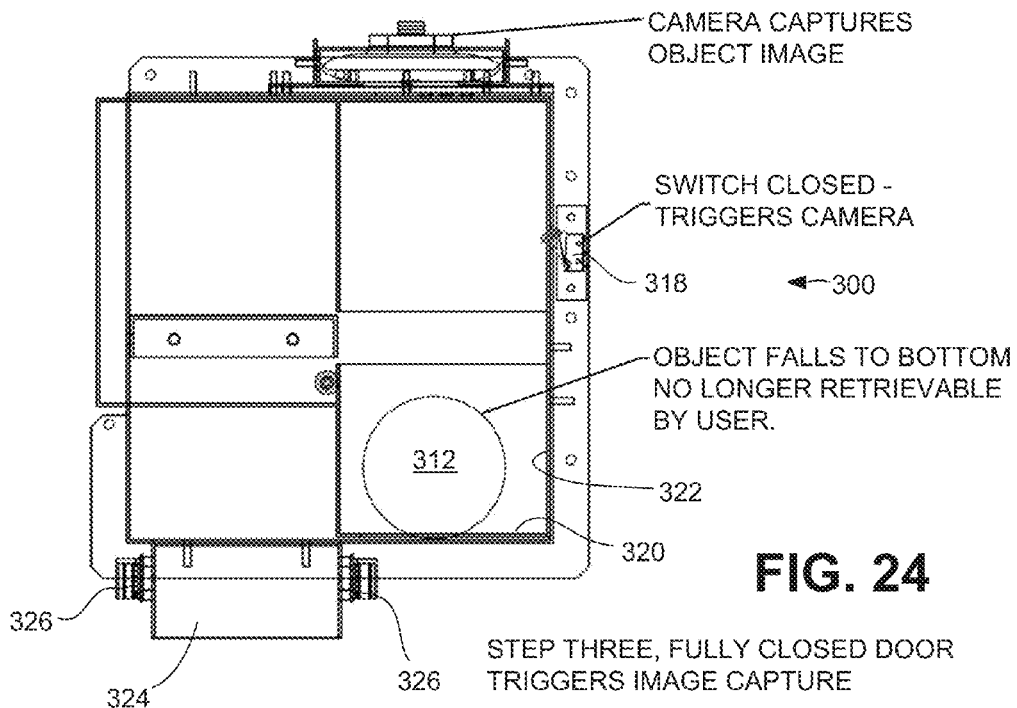
FIG. 24 illustrates a front elevation view of the object receiving system of FIGS. 20-23 with the door in a fully closed position, according to embodiments of the present invention.
Figure 25:
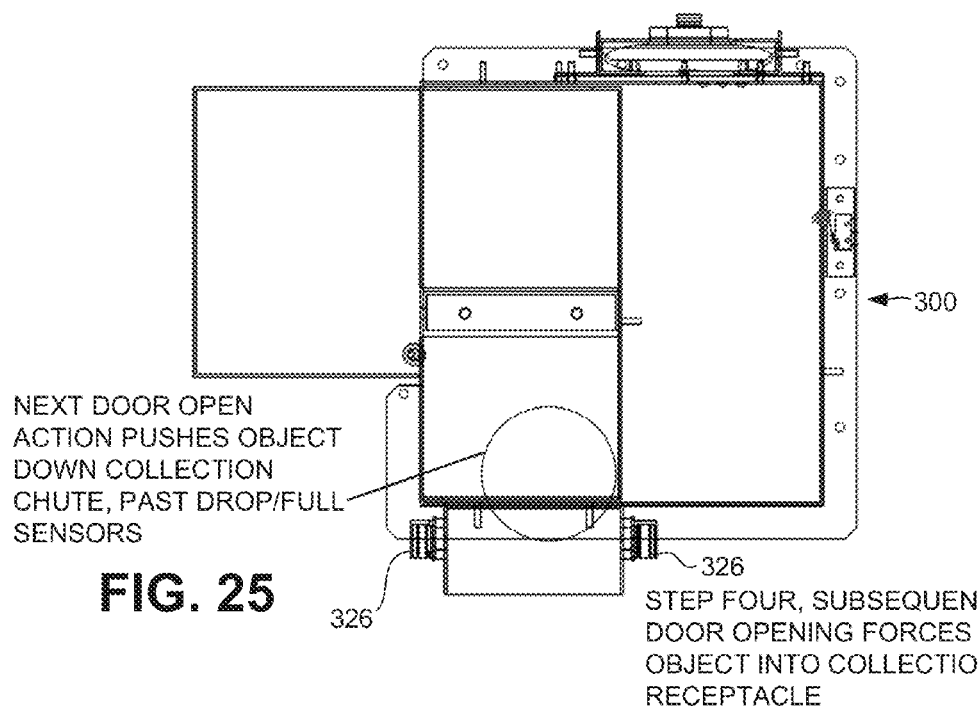
FIG. 25 illustrates a front elevation view of the object receiving system of FIGS. 20-24 with the door in a fully open position, according to embodiments of the present invention.

When the door 302 is opened, an object 312 may be placed into the object receiving area 305, as shown in FIG. 22. The object may be, for example, an object intended to be recycled, such as an aluminum can, according to embodiments of the present invention. The object 312 is placed onto a shelf 310, which according to some embodiments is a stationary shelf.

Once the object 312 is inserted into the object receiving area 305, the knob 303 may be slid in the opposite direction to close the door 302 over the object delivery window 328. As the door 302 closes or is closed, the side wall 314 of the object receiving area 305 advances in the direction indicated by arrow 332 and pushes the object 312 from the object receiving area 305 into the object auditing area 306. The object 312 falls to a bottom surface 320 of the object auditing area 306.

A switch 318 is mounted on an inside wall 334 of the housing 330. Other switches and/or proximity detection devices may be used instead of or in addition to switch 318. As door 302 is opened fully, the leading wall 316 makes contact with switch 318 or otherwise activates switch 318. The control system 102 (which, as described above, may be communicably coupled to system 300) may be configured to receive a signal indicating that the switch 318 has been activated, and may then cause the camera 304 to capture one or more images of the object 312 while the object is in the object auditing area 306, according to embodiments of the present invention. The images may then be stored, locally and/or remotely, for use in later auditing the objects received. Camera is mounted in or on or near the object audit area 306 such that it can take pictures of the object 312, according to embodiments of the present invention.

The next time the door 302 is opened, for example to accommodate the receipt of another object, the lower inside wall 322 of the door assembly moves in a direction opposite to arrow 332. The lower inside wall 322 pushes the object 312 from the object auditing area 306 into the object drop chute 324. The object drop chute 324 may further include one or more drop/fall sensors 326 configured to inform the control system (e.g. system 102) that an object has passed therethrough. The objects may drop or fall into a bin placed under the chute 324, according to embodiments of the present invention. Drop/fall sensors 326 may also be used to indicate to the control system that a bin or stack of objects below the chute 324 is full, for example if sensors detect presence of something within the chute 324 for a longer period of time than associated with a falling object. Accordingly, the same action that moves the door 302 from the closed to the open position also moves any object that was in the object auditing area 306 into the object drop chute 324 and into a receiving bin (not shown).

System 300 permits objects to be inserted through the object receiving window 328 only when the door 302 is open, according to embodiments of the present invention. The arrangement of the sizes and shapes of the door 302 and the door assembly prevent access to the object 312 and/or the object auditing area 306 when the door 302 has been closed, and also prevent access to the object auditing area 306 and camera 304 at all times. This prevents tampering with the object 312 or the audit process. The system 300 thus permits easy receiving, auditing, and dropping of an object into an underlying bin all with a single manual action, for example the sliding of knob 303, according to embodiments of the present invention. The arrangement of the system 300 also minimizes the number of moving parts, and relies on gravity and the simple sliding action of the door assembly for the auditing function, according to embodiments of the present invention.

Figure 26:
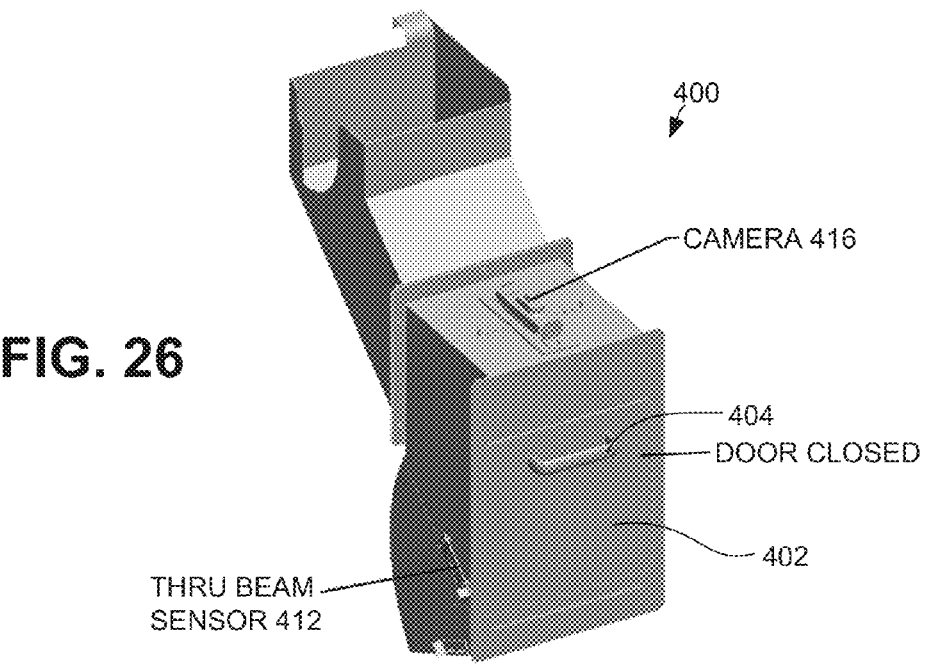
FIG. 26 illustrates a front and left side perspective view of a product delivery system, according to embodiments of the present invention.
Figure 27:
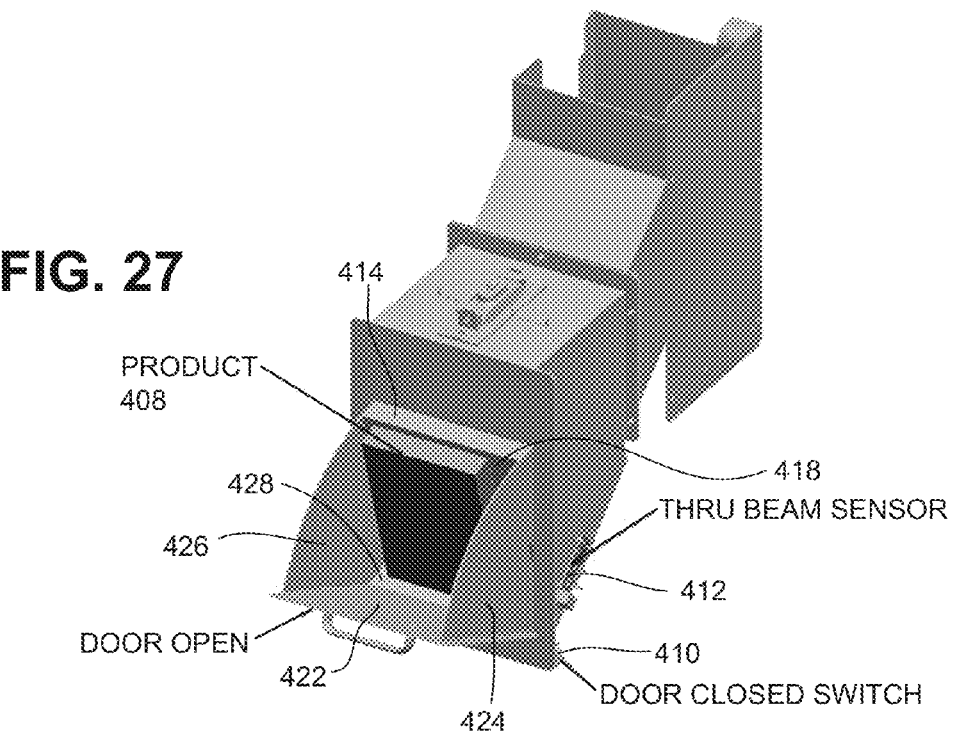
FIG. 27 illustrates a front and right side view of the product delivery system of FIG. 26, according to embodiments of the present invention.
Figure 28:
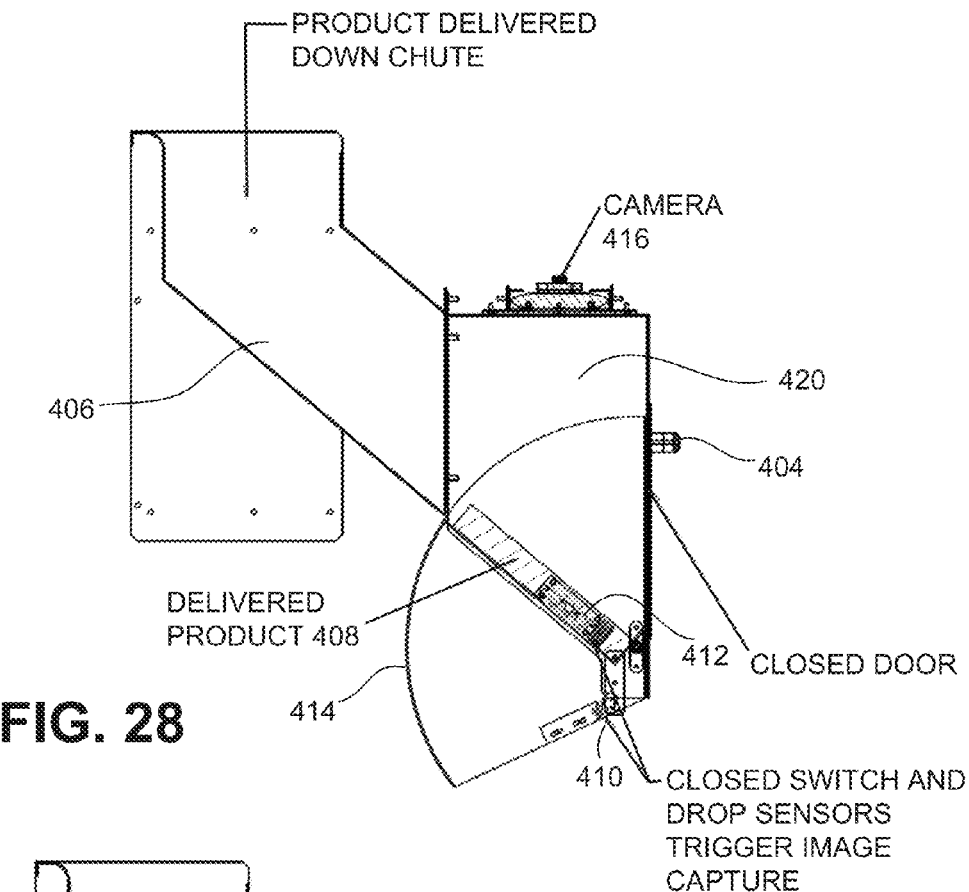
FIG. 28 illustrates a left side elevation cross-sectional view of the product delivery system of FIGS. 26-27 with the door in a closed position, according to embodiments of the present invention.
Figure 29:
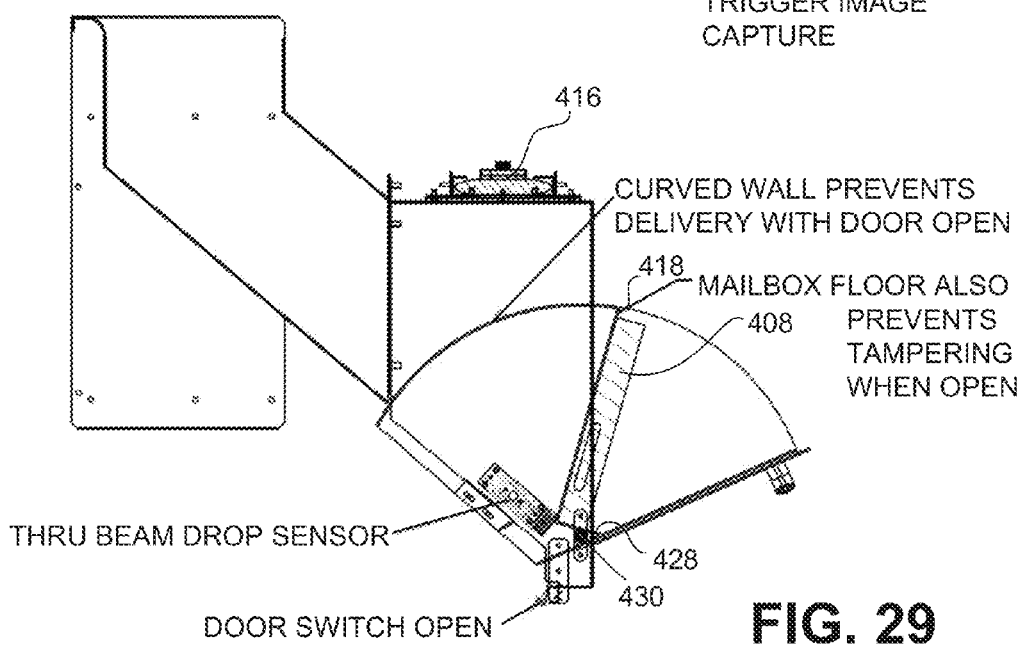
FIG. 29 illustrates a left side elevation cross-sectional view of the product delivery system of FIGS. 26-27 with the door in a closed position, according to embodiments of the present invention.

FIGS. 26-29 illustrate an alternative product delivery system 400, according to embodiments of the present invention. Product delivery system 400 may be used along with system 10, and/or may be used independently of system 10, according to embodiments of the present invention. Product delivery system 400 includes a delivery chute 406 down which the product 412 slides and comes to rest (or stops) on the bottom 428 of the door assembly, in the product audit area 420. FIG. 26 shows the system 400 with the door 402 closed, while FIG. 27 shows the system 400 with the door 402 open. When the door 402 is closed, a door switch 410 senses that the door is closed. Other switches or switch-type mechanisms may be used to confirm that the door 402 is closed, according to embodiments of the present invention. Another sensor or group of sensors 412, for example through-beam sensors 412, detect the presence of a product 412 in the product audit area 420, according to embodiments of the present invention. If the sensors 412 detect a product 412 in the product audit area 420, and if the switch 410 detects that the door 402 is closed, then the control system 102 (to which system 400 may also be communicably coupled) causes the camera 416 to gather information about the product 412, for example visual information in the form of one or more photographs. Such information or photographs may be stored, locally and/or remotely, in order to audit information about product delivery. For example, if a customer alleges that the wrong product was delivered, or that no product was delivered, the records associated with a particular sale (for example sale of a product by system 10) may be retrieved and the audit information (e.g. photograph of the product in the delivery bin/audit area 420) compared with the information about the transaction.

After the audit information gathering has taken place in the product audit area 420, the door 402 may be opened, for example by the customer pulling on the door handle 404, according to embodiments of the present invention. According to some embodiments of the present invention, the door 402 includes a front panel 422, a rear panel 418, a curved back wall 414, side walls 424, 426, and a bottom 428. The front panel 422 prevents access to the audit area 420 when the door 402 is closed. When the door is open, the curved back wall 414 prevents delivery of any product into the door 402 when the door 402 is open (thereby preventing inadvertent delivery of extra product or product which has not been payed for). The door 402 pivots about a pivot axis 430, according to embodiments of the present invention. System 400 permits secure product delivery and accurate tamper-proof auditing of product delivery, according to embodiments of the present invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A system for receiving and auditing objects, comprising:
    a housing having a front panel, a receiving area, an auditing area, and a drop chute, wherein the receiving area includes a stationary shelf forming a bottom portion of the receiving area, wherein the front panel comprises an opening;
    a door assembly having a first pushing wall and a second pushing wall, the door assembly moveable with respect to the housing between an open position in which the opening at least partially aligns with the receiving area to permit an object to be inserted through the opening and onto the stationary shelf of the receiving area, and a closed position in which the door assembly prevents access to the receiving area through the front panel;
    wherein the first pushing wall is configured to move the object from the stationary shelf into the auditing area as the door assembly is moved from the open position to the closed position; and
    a control system communicably coupled to a camera and a switch, wherein the door assembly is configured to activate the switch when the door assembly is in or near the closed position, the control system configured to capture a representation of the object with the camera in response to activation of the switch;
    wherein the second pushing wall is configured to move the object from the auditing area to the drop chute as the door assembly is moved from the closed position to the open position.

2. The system of claim 1, wherein the first pushing wall and the second pushing are rigidly interconnected such that they move as a single unit.

3. The system of claim 1, wherein the auditing area is below the receiving area, such that the first pushing wall is further configured to move the object from the stationary shelf to cause it to fall into the auditing area.

4. The system of claim 1, wherein the stationary shelf is substantially flat.

5. The system of claim 1, wherein the switch is a mechanical switch.

6. The system of claim 5, wherein the first pushing wall contacts the mechanical switch to activate the mechanical switch when the door assembly is in the closed position.

7. The system of claim 1, wherein the representation of the object is a photographic image of the object.

8. The system of claim 1, further comprising an actuator, the actuator coupled to the door assembly and configured to move the door assembly between the open and closed positions.

9. The system of claim 8, wherein the actuator comprises a knob, wherein the knob is on an opposite side of the front panel from the door assembly.

10. The system of claim 9, wherein the front panel includes a slot through which the knob moves as the door assembly is moved between the open and closed positions, wherein the slot is configured to limit movement of the door assembly.

11. The system of claim 1, wherein movement of the door assembly between the open and closed positions is a sliding along a substantially horizontal direction.

12. The system of claim 1, further comprising one or more drop sensors communicably coupled to the control system, the one or more drop sensors configured to detect the product passing through the drop chute.

13. A system for receiving and auditing objects, comprising:
    a housing having a front panel, a receiving area, an auditing area, and a drop chute, wherein the receiving area includes a shelf forming a bottom portion of the receiving area, wherein the front panel comprises an opening;
    a door assembly having a pushing wall and a second pushing wall, the door assembly moveable with respect to the housing between an open position in which the opening at least partially aligns with the receiving area to permit an object to be inserted through the opening and onto the shelf of the receiving area, and a closed position in which the door assembly prevents access to the receiving area through the front panel;
    wherein the pushing wall is configured to move the object from the shelf into the auditing area as the door assembly is moved from the open position to the closed position; and a control system communicably coupled to a camera and a switch, wherein the door assembly is configured to activate the switch when the door assembly is in or near the closed position, the control system configured to capture an image of the object with the camera in response to activation of the switch.

14. A system for product delivery and audit, the system comprising:
- a door assembly, the door assembly coupled to a product delivery chute at a pivot axis, the door assembly moveable between a closed position and an open position by pivoting about the pivot axis;
- wherein the door assembly comprises an audit area, and wherein in the closed position the door assembly prevents access to the audit area, and the audit area is configured to receive product from the product delivery chute;
- a control system communicably coupled to a camera, a door sensor, and a product sensor, wherein the control system is configured to capture a representation of the product with the camera when the door sensor senses that the door assembly is in the closed position and the product sensor senses that the product is in the audit area;
- wherein in the open position the door assembly permits access to the product for which a representation had previously been captured, and wherein in the open position the door assembly also prevents access to the audit area and prevents access to additional products delivered through the product delivery chute while the door assembly is in the open position.

15. The system of claim 14, wherein the door assembly is biased toward the closed position.

16. The system of claim 14, wherein the product sensor is a through-beam sensor.

17. The system of claim 14, wherein the door assembly comprises a curved top wall and a rear panel, wherein the rear panel is configured to receive the product when the product is received into the audit area from the product delivery chute, and wherein the curved top wall and the rear panel block access to the audit area when the door assembly is in the open position.

18. The system of claim 17, wherein a product receiving surface of the rear panel is at a first angle when the door assembly is in the closed position, wherein an inner bottom surface of the product delivery chute is at a second angle, and wherein the first angle is substantially the same as the second angle so as to permit the product to slide smoothly from the inner bottom surface to the product receiving surface.

19. The system of claim 14, wherein the door assembly further comprises a handle, wherein pulling of the handle moves the door assembly from the closed position to the open position.

20. The system of claim 14, wherein the camera is mounted at a top of the audit area above the door assembly.

* * * * *